US005860050A

United States Patent [19]

Shimamura et al.

[11] Patent Number: 5,860,050

[45] Date of Patent: Jan. 12, 1999

[54] DEVELOPER CARRYING MEMBER, DEVELOPING ASSEMBLY, IMAGE FORMING APPARATUS, AND PROCESS CARTRIDGE

[75] Inventors: Masayoshi Shimamura; Yasuhide Goseki; Kenji Fujishima, all of Yokohama; Michiko Orihara, Tokyo; Kazunori Saiki, Yokohama; Mayoko Maruyama; Takuya Toyooka, both of Tokyo, all of Japan

[73] Assignee: Canon Kabushiki Kaisha, Tokyo, Japan

[21] Appl. No.: 884,623

[22] Filed: Jun. 27, 1997

Related U.S. Application Data

[63] Continuation of Ser. No. 578,343, Dec. 26, 1995, abandoned.

[30] Foreign Application Priority Data

Dec. 28, 1994 [JP] Japan .................................... 6-337616

[51] Int. Cl.[6] ............................ G03G 15/09; C09D 11/00

[52] U.S. Cl. .......................... 399/276; 399/265; 399/267; 399/274

[58] Field of Search .................................... 399/222, 267, 399/265, 274, 276; 428/35.8; 430/106.6, 122, 120

[56] References Cited

U.S. PATENT DOCUMENTS

| | | | |
|---|---|---|---|
| 4,034,709 | 7/1977 | Fraser et al. | 118/658 |
| 4,614,682 | 9/1986 | Suzuki et al. | 428/213 |
| 4,989,044 | 1/1991 | Nishimura et al. | 355/251 |
| 5,177,537 | 1/1993 | Okano et al. | 355/259 |
| 5,202,729 | 4/1993 | Miyamoto et al. | 355/251 |
| 5,210,617 | 5/1993 | Tomiyama et al. | 355/259 X |
| 5,215,845 | 6/1993 | Yusa et al. | 430/106.6 |

FOREIGN PATENT DOCUMENTS

| | | |
|---|---|---|
| 0410456 | 1/1991 | European Pat. Off. . |
| 0421331 | 4/1991 | European Pat. Off. . |
| 0516419 | 12/1992 | European Pat. Off. . |
| 3-200986 | 2/1991 | Japan . |
| 3-95574 | 4/1991 | Japan . |

*Primary Examiner*—Arthur T. Grimley
*Assistant Examiner*—Sophia S. Chen
*Attorney, Agent, or Firm*—Fitzpatrick, Cella, Harper & Scinto

[57] ABSTRACT

A developer carrying member includes a substrate, the surface of which is covered with a conducting layer. The conducting layer contains a binder resin and conducting spherical particles dispersed therein having a number average particle diameter of from 0.3 $\mu$m to 30 $\mu$m and a true density of 3 g/cm$^3$ or below.

135 Claims, 6 Drawing Sheets

DEVELOPER CARRYING MEMBER, DEVELOPING ASSEMBLY, IMAGE FORMING APPARATUS, AND PROCESS CARTRIDGE

This application is a continuation of application Ser. No. 08/578,343, filed Dec. 26, 1995, now abandoned.

BACKGROUND OF THE INVENTION

1. Field of the Invention

This invention relates to a developer carrying member used when an electrostatic latent image formed on an electrostatic latent image bearing member such as an electrophotographic photosensitive member or an electrostatic recording dielectric material is rendered visible by development. It also relates to a developing assembly, an image forming apparatus and process cartridge using such a developer carrying member.

2. Description of the Related Art

As an example of developing assemblies for visualizing electrostatic latent images formed on a photosensitive drum serving as an electrostatic latent image bearing member by the use of a magnetic toner as a one component type developer, such an assembly as shown in FIG. 6 is known, in which a developer container 53 holds a magnetic toner 54 as the one component type developer, and electric charge having a reverse polarity to the electric charge of the electrostatic image formed on a photosensitive drum 51 and to the development standard potential is imparted to magnetic toner particles by the friction between particles of the magnetic toner and the friction between a developing sleeve 58 as a developer carrying member and the magnetic toner particles. The magnetic toner thus charged is very thinly coated on the developing sleeve 58 by means of a magnetic blade 52 and then transported to the developing zone, D, defined by the photosensitive drum 51 and the developing sleeve 58. In the developing zone D, the magnetic toner is attracted by the action of a magnetic field formed by a magnet 55 stationarily set on the developing sleeve 58 to visualize the electrostatic latent image on the photosensitive drum 51. In the drawing, letter symbols A and B denote the directions of rotation of the developing sleeve 58 and the photosenitive drum 51, respectively. Reference numeral 59 denotes a development bias means for applying a development bias voltage at the time of development; and 60, denotes an agitating element for agitating the magnetic toner 54 inside the developer container 53.

When, however, such a one component type developer is used, it is difficult to control the toner charging. Although various means have been considered in connection with developers, the problems concerning non-uniformity of charging and running stability of charging are not completely solved.

Especially when the developing sleeve is repeatedly rotated on, the toner coated on the developing sleeve comes to have a too large of a charge quantity due to contact with the developing sleeve, so that the toner and the developing sleeve surface attract each other on account of the reflective force and the toner turns immobile on the surface of the developing sleeve. This phenomenon is called “charge-up”, which especially tends to occur in an environment of low humidity. Once such charge-up has occurred, the toner forming an upper layer on the sleeve is difficult to charge so that the quantity of toner participating in development is lowered, raising such problems that line images are made thinner or solid-image density is reduced.

Moreover, the toner layer may be formed in a different state at image areas (where toner is consumed) and non-image areas to have been charged in different conditions, and hence, for example, if the position where a solid image with a high image density has been once formed by development comes to the development position on the next rotation of the developing sleeve and a latent halftone image is developed at that position, a mark of the solid image may appear on the image. Such a phenomenon, which is called “sleeve ghost”, is liable to occur.

Recently, in order to make electrophotographic image quality much higher, toners have been made to have smaller particle diameters and made finer. For example, in order to improve resolution and sharpness and faithfully reproduce latent images, it is common to use toners with a weight average particle diameter of about 6 to 9 $\mu$m. Also, for the purpose of making a copying time shorter and power consumption smaller, there is a tendency toward lower fixing temperatures. Under such circumstances, the toner is more liable to electrostatically adhere onto the developing sleeve and when external physical force is applied, the surface of the developing sleeve may be contaminated and the toner may be melt-adhered.

As a method to prevent such phenomena, it is proposed to use in a developing assembly a developing sleeve having a metal substrate provided with a coat layer formed of a resin in which a solid lubricant and a conductive fine powder such as carbon powder are dispersed. The use of this method can be seen to greatly reduce the occurrence of the above phenomena. In this method, however, the surface shape of the developing sleeve is uneven and hence uniform charging still cannot be achieved sufficiently, leaving such problems on durability or running performance that the coat layer may become brittle.

Japanese Patent Application Laid-open No. 3-200986 discloses a developing sleeve comprising a metal substrate provided with a conductive coat layer formed of a resin in which a solid lubricant, a conductive fine powder such as carbon powder and also spherical particles are dispersed. In this developing sleeve, the shape of the developing sleeve surface is made uniform, the charging is uniform and wear resistance is improved. However, even in this developing sleeve, its running performance is sought to be more improved, e.g., in wear resistance of the conductive coat layer and prevention of toner contamination and melt-adhesion of toner when the sleeve has worn.

OBJECTS OF THE INVENTION

An object of the present invention is to provide a developer carrying member in which a conductive coat layer formed on its surface is less deteriorated due to repeated copying or running, which has a high durability and can give stable images; and a developing assembly, an image forming apparatus and a process cartridge which have such a developer carrying member.

Another object of the present invention is to provide a developer carrying member which may cause no problems such as density decrease, sleeve ghost and fogging over a long period of time under various environmental conditions and can stably give high-grade images; and a developing assembly, an image forming apparatus and a process cartridge which have such a developer carrying member.

Still another object of the present invention is to provide a developer carrying member which can inhibit uneven charging of toner on the developer carrying member surface when toners having small particle diameters are used, and can impart charges to toners in a proper quantity; and a developing assembly, an image forming apparatus and a process cartridge which have such a developer carrying member.

SUMMARY OF THE INVENTION

It has been discovered that the foregoing objects can be realized by providing a developer carrying member comprising a substrate the surface of which is covered with a conductive coat layer, wherein;

the conductive coat layer contains at least a binder resin and conductive spherical particles dispersed therein having a number average particle diameter of from 0.3 $\mu$m to 30 $\mu$m and a true density of 3 g/cm$^3$ or below.

The present invention also provides a developing assembly comprising;

a developer container holding a developer; and a developer carrying member for carrying the developer held in the developer container and transporting the developer to the developing zone;

wherein the developer carrying member comprises a substrate the surface of which is covered with a conductive coat layer, the conductive coat layer containing at least a binder resin and conductive spherical particles dispersed therein having a number average particle diameter of from 0.3 $\mu$m to 30 $\mu$m and a true density of 3 g/cm$^3$ or below.

The present invention further provides an image forming apparatus comprising;

a latent image bearing member for bearing an electrostatic latent image, and a developing assembly for developing the electrostatic latent image to form a developed image;

the developing assembly comprising;

a developer container holding a developer; and a developer carrying member for carrying the developer held in the developer container and transporting the developer to the developing zone;

wherein the developer carrying member comprises a substrate the surface of which is covered with a conductive coat layer, the conductive coat layer containing at least a binder resin and conductive spherical particles dispersed therein having a number average particle diameter of from 0.3 $\mu$m to 30 $\mu$m and a true density of 3 g/cm$^3$ or below.

The present invention still further provides a process cartridge detachably mountable on a main assembly of an image forming apparatus, comprising;

a latent image bearing member for bearing an electrostatic latent image, and a developing means for developing the electrostatic latent image;

the developing means comprising;

a developer; and a developer carrying member for carrying and transporting the developer to the developing zone;

wherein the developer carrying member comprises a substrate the surface of which is covered with a conductive coat layer, the conductive coat layer containing at least a binder resin and conductive spherical particles dispersed therein having a number average particle diameter of from 0.3 $\mu$m to 30 $\mu$m and a true density of 3 g/cm$^3$ or below.

DESCRIPTION OF THE PREFERRED EMBODIMENTS

Figure 1:
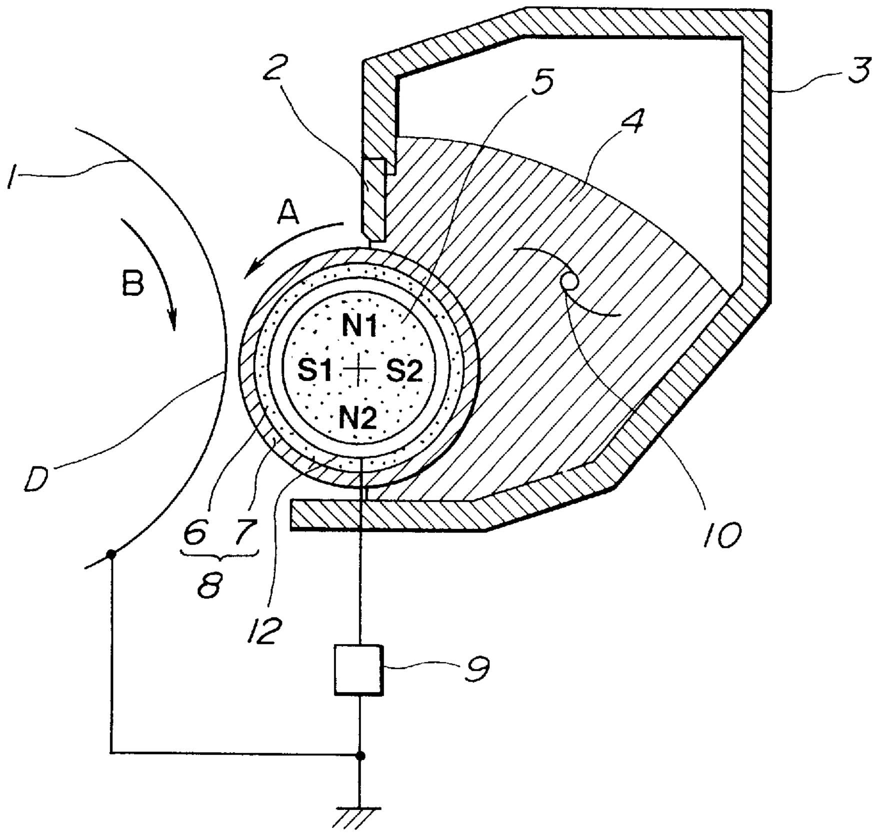
FIG. 1 is a schematic drawing illustrating a developing assembly according to an embodiment of the present invention, having a developer carrying member which has a conductive coat layer.

The developer carrying member of the present invention is provided with a specific conductive coat layer on its surface, whereby its durability can be more greatly improved than those conventionally used, and the conductive coat layer on the surface of the developer carrying member may be less worn and deteriorated, not causing toner contamination. Hence, high-grade images can be provided over a long period of time substantially without causing decrease in image density and occurrence of ghost and fogging.

The present invention will be described below in detail.

Conductive spherical particles used in the conductive coat layer that covers the surface of a substrate constituting the developer carrying member of the present invention will be described.

The conductive spherical particles used in the present invention have a number average particle diameter of from 0.3 $\mu$m to 30 $\mu$m, and preferably from 2 $\mu$m, to 20 $\mu$m, and a true density of 3 g/cm$^3$ or below. Such conductive spherical particles are added so that the surface of the conductive coat layer in the developer carrying member of the present invention can retain a uniform surface roughness and also, even when the surface of the conductive coat layer has worn, the surface roughness of the conductive coat layer may change less so that contamination by toner and melt-adhesion of toner on the developer carrying member hardly occur.

Conductive spherical particles having a number average particle diameter smaller than 0.3 $\mu$m are not preferable because the uniform roughness cannot be effectively imparted to the surface of the conductive coat layer, and the charge-up of toner, contamination by toner and melt-adhesion of toner may occur because of the wear of the conductive coat layer, resulting in poor images due to sleeve ghost and a decrease in image density. Those having a number average particle diameter larger than 30 $\mu$m also are not preferable because the conductive coat layer may have too great a roughness, making it difficult for the toner to be charged well and to cause a decrease in mechanical strength of the conductive coat layer.

In the present invention, the "spherical" in the conductive spherical particles refers to particles having a major axis/minor axis ratio of from about 1.0 to 1.5. It is preferable to use particles having a major axis/minor axis ratio of from 1.0 to 1.2, and particularly to use truely spherical particles.

Conductive spherical particles having a major axis/minor axis ratio higher than 1.5 are not preferable in view of uniform charging of the toner and strength of the conductive coat layer, because the dispersibility of the conductive spherical particles in the conductive coat layer may be lowered and also the surface roughness of the conductive coat layer may be non-uniform.

In the present invention, as conductivity of the conductive spherical particles, the particles may have a volume resistivity of $10^6$ Ω·cm or below, and preferably a volume resistivity of from $10^3$ Ω·cm to $10^{-6}$ Ω·cm.

Conductive spherical particles having a volume resistivity higher than $10^6$ Ω·cm are not preferable because spherical particles laid bare to the surface of the conductive coat layer as a result of wear may serve as nuclei to cause toner contamination and melt-adhesion.

The conductive spherical particles used in the present invention have a true density of 3 g/cm$^3$ or below, preferably 2.7 g/cm$^3$ or below, and more preferably from 0.9 to 2.7 g/cm$^3$.

Conductive spherical particles having a true density exceeding 3 g/cm$^3$ are not preferable because the dispersibility of the spherical particles in the conductive coat layer is insufficient so that a uniform roughness may not be imparted to the surface of the coat layer, resulting in an insufficient uniform charging of the toner and strength of the coat layer.

The conductive spherical particles used in the present invention may preferably be obtained by methods as described below, but not limited thereto.

As a method for obtaining particularly preferable conductive spherical particles used in the present invention, there is, for example, a method in which spherical resin particles or mesocarbon microbeads are fired and thereby converted into carbon particles and/or graphite particles to obtain spherical carbon particles having a low density and a good conductivity.

Resin used as the spherical resin particles may include, for example, phenol resins, naphthalene resins, furan resins, xylene resins, divinylbenzene polymers, styrene-divinylbenzene copolymers, and polyacrylonitrile.

The mesocarbon microbeads can be usually produced by subjecting spherical crystals formed in the course of heating and firing a mesopitch, to washing with a large quantity of tar middle oil or solvent such as quinoline.

The method may more preferably include a method in which the surfaces of spherical particles, such as phenol resin, naphthalene resin, furan resin, xylene resin, divinylbenzene polymer, styrene-divinylbenzene copolymer or polyacrylonitrile particles, are coated with bulk-mesophase pitch by a mechanochemical method, and the particles thus coated are heated in an oxidative atmosphere, followed by firing so as to be converted into carbon particles and/or graphite particles to give conductive spherical carbon particles.

When the conductive spherical carbon particles are obtained by the above methods, the conductivity of the spherical carbon particles can be controlled to a certain degree by changing conditions for firing, and such particles are preferably used in the present invention.

The spherical carbon particles obtained by the above methods may optionally be coated with conductive metal and/or metal oxide to such an extent that the true density of the conductive spherical particles does not exceed 3 g/cm$^3$.

As another methods for obtaining the conductive spherical particles used in the present invention, there is a method in which core particles comprised of spherical resin particles and conductive fine particles having smaller particle diameters than the core particles are mechanically mixed in a suitable mixing ratio to cause the conductive fine particles to uniformly adhere to the peripheries of the core particles by the action of van der Waals force and electrostatic force, and thereafter the surfaces of the core particles are softened by local temperature rise caused by imparting mechanical impact so that the conductive fine particles form coats on the core particle surfaces, obtaining spherical resin particles subjected to conducting treatment.

As the core particles, it is preferable to use spherical resin particles comprised of an organic compound and having a small true density. Resin for such particles may include, for example, PMMA, acrylic resins, polybutadiene resins, polystyrene resins, polyethylenes, polypropylenes, polybutadienes, or copolymers of any of theses, benzoguanamine resins, phenol resins, polyamide resins, nylons, fluorine resins, silicone resins, epoxy resins and polyester resins.

As the conductive fine particles (coat particles) used when coats are formed on the core particles (base particles), it is preferable to use coat particles having a particle diameter of 1/8 or less of the base particles so that the coats of conductive fine particles can be uniformly provided.

As still another method for obtaining the conductive spherical particles used in the present invention, there is a method in which conductive fine particles are uniformly dispersed in spherical resin particles to give conductive spherical particles with the conductive fine particles dispersed therein. As a method for uniformly dispersing the conductive fine particles in the spherical resin particles, there is, for example, a method in which a binder resin and conductive fine particles are kneaded to disperse the latter in the former, and thereafter the product is pulverized into particles having a given particle diameter, followed by mechanical treatment and thermal treatment to make the particles spherical; and a method in which a polymerization initiator, conductive fine particles and other additives are added in polymerizable monomers and uniformly dispersed therein by means of a dispersion machine to give a monomer composition, followed by suspension polymerization in an aqueous phase containing a dispersion stabilizer by means of a stirrer so as to provide a given particle diameter, obtaining spherical particles with conductive fine particles dispersed therein. The conductive spherical particles with the conductive fine particles dispersed therein, obtained by this method may be further mechanically mixed with additional conductive fine particles having smaller particle diameters than the core particles, in a suitable mixing ratio to cause the additional conductive fine particles to uniformly adhere to the peripheries of the spherical resin particles by the action of van der Waals force and electrostatic force, and thereafter the surfaces of the resin particles with the conductive fine particles dispersed therein are softened by local temperature rise caused by imparting mechanical impact so that the additional conductive fine particles form coats on the resin particle surfaces, obtaining spherical resin particles with a higher conductivity.

In the conductive coat layer constituting the developer carrying member of the present invention, a lubricating material may be dispersed while used in combination with the conductive spherical particles. This is preferable since the present invention can be made more effective.

Such lubricating material may include, for example, graphite, molybdenum disulfide, boron nitride, mica, graphite fluoride, silver-niobium selenide, calcium chloride-graphite, talc, and fatty acid metal salts such as zinc stearate. Of these, graphite is particularly preferable because conductivity of the conductive coat layer is not deteriorated when used in combination with the conductive spherical particles.

As this lubricating material, those having a number average particle diameter of preferably from 0.2 to 20 μm, and more preferably from 1 to 15 μm, may be used.

Lubricating materials having a number average particle diameter smaller than 0.2 μm are not preferable because the addition of the lubricating material can not be well effective. Those having a number average particle diameter larger than 20 μm are not preferable in view of uniform charging of the toner and strength of the conductive coat layer, because the surface roughness of the conductive coat layer may be non-uniform.

The conductive coat layer constituting the developer carrying member of the present invention is formed by dispersing in the binder resin the conductive spherical particles and lubricating material as described above. As the binder resin used herein, it is possible to use, e.g., thermoplastic resins such as styrene resins, vinyl resins, polyether sulfone resin, polycarbonate resin, polyphenylene oxide resin, polyamide resins, fluorine resins, cellulose resins and acrylic resins; and photo- or heat-curable resins such as epoxy resins, polyester resins, alkyd resins, phenol resins, melamine resins, polyurethane resins, urea resins, silicone resins and polyimide resins. In particular, more preferred are those having release properties, such as silicone resins and fluorine resins, and those having good mechanical properties, such as polyether sulfone, polycarbonate, polyphenylene oxide, polyamide, phenol, polyester, polyurethane, styrene resins and acrylic resins.

In the present invention, the conductive coat layer of the developer carrying member may preferably have a volume resistivity of $10^3$ Ω·cm or below, and more preferably from $10^3$ to $10^{-2}$ Ω·cm.

If the conductive coat layer has a volume resistivity exceeding $10^3$ Ω·cm, the charge-up of toner tends to occur, so that ghost or density decrease is liable to occur.

In the present invention, in order to control the volume resistivity of the conductive coat layer, different conductive fine particles may be dispersed and incorporated into the conductive coat layer while used in combination with the conductive spherical particles described above. Such different conductive fine particles may preferably be those having a number average particle diameter of 1 μm or smaller, and more preferably from 0.01 to 0.8 μm.

If the different conductive fine particles dispersed and incorporated into the conductive coat layer, used in combination with the conductive spherical particles, have a number average particle diameter larger than 1 μm, it may become difficult to control the volume resistivity of the conductive coat layer to be low, and causing the charge-up of toner to be is liable to occur.

The conductive fine particles usable in the present invention may include, for example, carbon blacks such as furnace black, lamp black, thermal black, acetylene black and channel black; metal oxides such as titanium oxide, tin oxide, zinc oxide, molybdenum oxide, potassium titanate, antimony oxide and indium oxide; fine particles of metals such as aluminum, copper, silver and nickel; and inorganic fillers such as graphite, conductive metal fibers and conductive carbon fibers.

The developer carrying member of the present invention is constituted as below.

The developer carrying member of the present invention is mainly comprised of a metal cylinder serving as the substrate, and the conductive coat layer which covers the metal cylinder along its periphery. As the metal cylinder, a stainless steel cylinder and an aluminum cylinder are preferably used.

The proportions of the make-up of respective components constituting the conductive coat layer will be described below, which ranges are particularly preferred in the present invention.

The conductive spherical particles dispersed in the conductive coat layer may preferably be in a content of from 2 to 120 parts by weight, and preferably from 2 to 80 parts by weight, based on 100 parts by weight of the binder resin, which range gives particularly preferable results. If the conductive spherical particles are in a content less than 2 parts by weight, the addition of the conductive spherical particles can be less effective. If they are in a content more than 120 parts by weight, the charging performance of the toner may become too low.

When the lubricating material and the conductive spherical particles are used in combination in the conductive coat layer, the lubricating material may preferably be in a content of from 5 to 120 parts by weight, and more preferably from 10 to 100 parts by weight, based on 100 parts by weight of the binder resin, which range gives particularly preferable results. If the lubricating material is in a content more than 120 parts by weight, the coat strength may be lowered and the charge quantity of the toner may be reduced. If it is in a content less than 5 parts by weight, the surface of the conductive coat layer may be contaminated by the toner.

When the conductive fine particles are incorporated in the conductive coat layer while used in combination with the conductive spherical particles, the conductive fine particles may preferably be in a content not more than 40 parts by weight, and more preferably from 2 to 35 parts by weight, based on 100 parts by weight of the binder resin, which range gives particularly preferable results. Use of the conductive fine particles in a content more than 40 parts by weight is not preferable because the coat strength may be lowered and the charge quantity of the toner may be reduced.

The conductive fine particles dispersed and incorporated in the conductive coat layer while used in combination with the conductive spherical particles may preferably have a number average particle diameter of 1 μm or smaller.

In the present invention, the conductive coat layer may preferably have a surface roughness, as centerline average height (hereinafter "Ra"), within the range of from 0.2 to 4.5 μm, and more preferably within the range of from 0.4 to 3.5 μm.

If the conductive coat layer has an Ra less than 0.2 μm, the ability of the toner to be transported is lowered so that a sufficient image density may not be obtained. If the conductive coat layer has an Ra exceeding 4.5 μm, the transport quantity of the toner is so large that the toner cannot be charged sufficiently. Thus, such Ra are not preferable.

The conductive coat layer constituted as described above may preferably have a layer thickness of 25 μm or less, more preferably 20 μm or less, and still more preferably from 4 to 20 μm. Such a thickness is preferable for obtaining a uniform layer thickness. The thickness is not particularly limited to this layer thickness.

The developing assembly, the image forming apparatus and the process cartridge in which the developer carrying member as described above is incorporated will be described below.

FIG. 1 schematically illustrates a developing assembly according to an embodiment of the present invention, having the developer carrying member.

As shown in FIG. 1, a latent image bearing member, e.g., an electrophotographic photosensitive drum 1, having an electrostatic latent image formed by a known process is rotated in the direction of an arrow B. A developing sleeve 8 as the developer carrying member carries a one component type developer 4 having a magnetic toner, fed by a hopper serving as the developer container, and is rotated in the direction of an arrow A. Thus, the developer 4 is transported to the developing zone D where the developing sleeve 8 and the photosensitive drum 1 face each other. As shown in FIG. 1, inside the developing sleeve 8, a magnet roller 5 internally provided with a magnet is provided so that the developer 4 is magnetically attracted and held onto the developing sleeve 8. The developing sleeve 8 used in the developing assembly of the present invention has a conductive coat layer 7 covering a metal cylinder 6 of the substrate. Inside the hopper 3, a stirring wing 10 for stirring the developer 4 is provided. Reference numeral 12 denotes a gap, showing that the developing sleeve 8 and the magnet roller are not in contact with each other.

The developer 4 gains triboelectric charges enabling development of the electrostatic latent image on the photosensitive drum 1, as a result of the friction between the particles of the magnetic toner and between the toner particles and the conductive coat layer 7 on the developing sleeve 8. In order to control the layer thickness of the developer 4 transported to the developing zone D, a magnetic control blade 2 made of a ferromagnetic metal, serving as a developer layer thickness control member, vertically extends downwards from the hopper 3 in such a manner that its lower end faces the developing sleeve 8, leaving a gap of about 50 to 500 $\mu$m wide. The magnetic lines of force exerted from a magnetic pole N1 of the magnet roller 5 are converged to the magnetic control blade 2 to form on the developing sleeve 8 a thin layer of the developer 4. In the present invention, a non magnetic blade may also be used in place of the magnetic control blade 2.

The thickness of the thin layer of the developer 4, thus formed on the developing sleeve 8, may preferably be smaller than the minimum gap between the developing sleeve 8 and the photosensitive drum in the developing zone D.

Incorporation of the developer carrying member is particularly effective in a type of a developing assembly in which electrostatic latent images are developed through such a developer thin layer, i.e., a non-contact type developing assembly. The developer carrying member of the present invention may also be applied in a type of developing assembly in which the thickness of the developer layer is larger than the minimum gap between the developing sleeve 8 and the photosensitive drum 1 in the developing zone D, i.e., a contact type developing assembly. To avoid complicated description, the non-contact developing assembly as described above is taken as an example in the following description.

In order to attract the one component type developer 4 having a magnetic toner, carried on the developing sleeve 8, a development bias voltage is applied to the developing sleeve through a power source 9 serving as a bias applying means. When a DC voltage is used as the development bias voltage, a voltage having a value intermediate between the potential at electrostatic latent image areas (the region rendered visible upon attraction of the developer 4) and the potential at background areas may preferably be applied to the developing sleeve 8. In order to enhance the density of developed images or improve the gradation thereof, an alternating bias voltage may be applied to the developing sleeve 8 to form in the developing zone D a vibrating electric field whose direction alternately reverses. In such a case, an alternating bias voltage formed by superimposing the above DC voltage component having a value intermediate between the potential at image areas to be developed and the potential at background areas may preferably be applied to the developing sleeve 8.

In the case of what is called regular development, where a toner is attracted to high-potential areas of an electrostatic latent image having high-potential areas and low-potential areas, a toner chargeable to a polarity reverse to the polarity of the electrostatic latent image is used. In the case of what is called reverse development, where a toner is attracted to low-potential areas of an electrostatic latent image having high-potential areas and low-potential areas, a toner chargeable to the same polarity as the polarity of the electrostatic latent image is used. What is meant by the high-potential areas or the low-potential areas is expressed by absolute value. In either case, the developer 4 is charged upon its friction with at least the developing sleeve 8.

Figure 2:
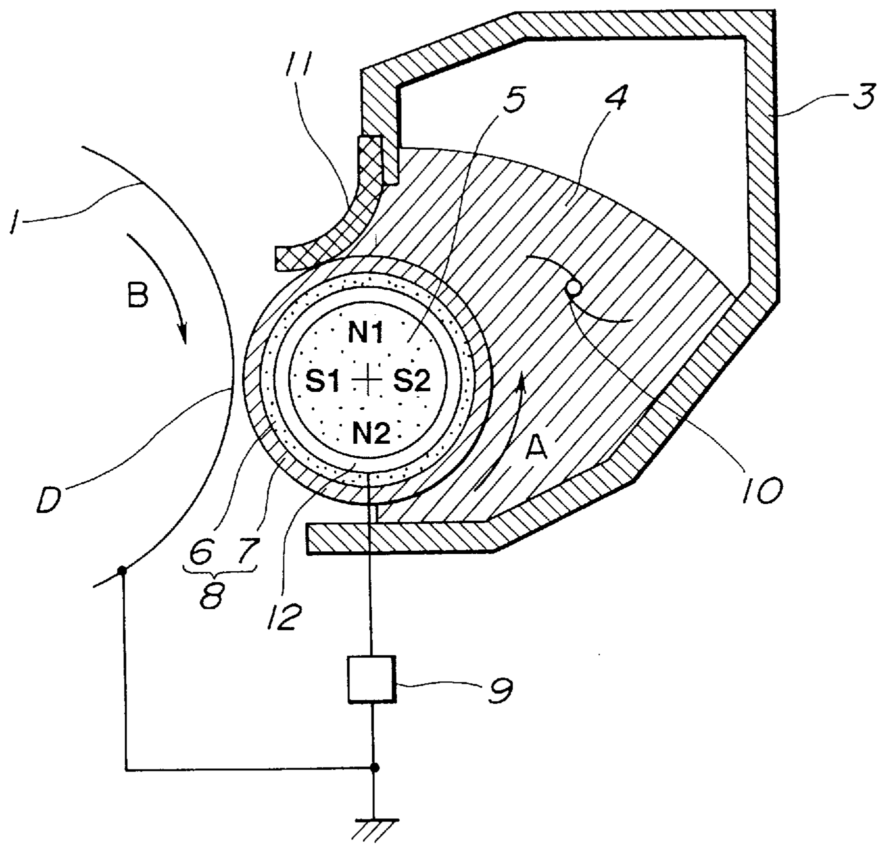
FIG. 2 is a schematic drawing illustrating a developing assembly according to another embodiment of the present invention, having a different developer layer thickness control member in the developing assembly shown in FIG. 1.
Figure 3:
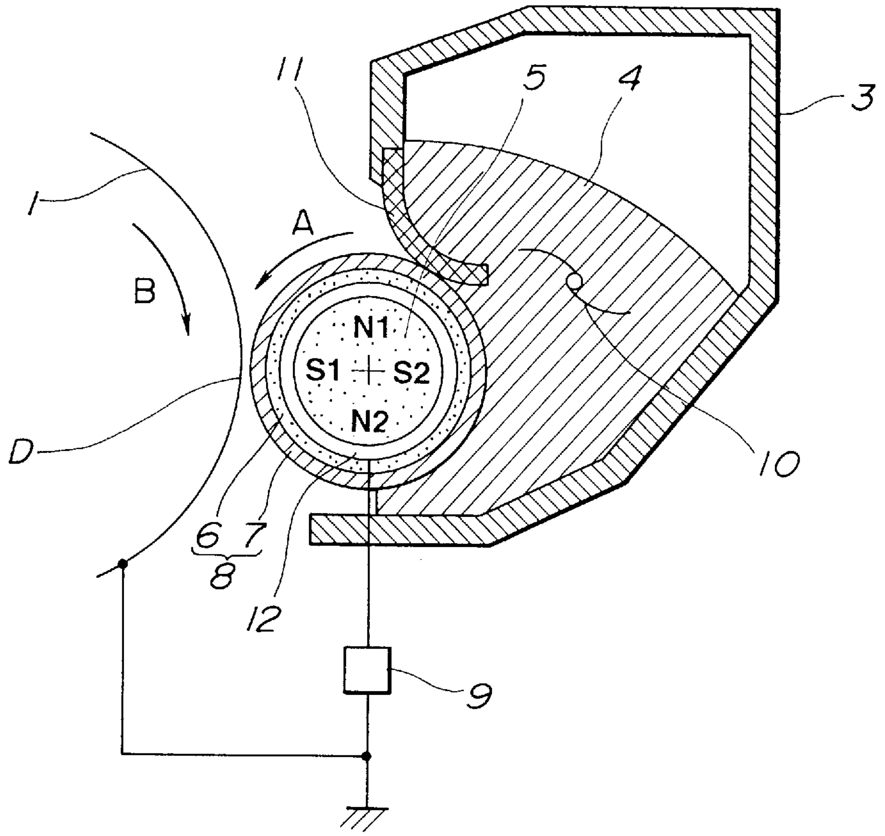
FIG. 3 is a schematic drawing illustrating a developing assembly according to a still another embodiment of the present invention, having a different developer layer thickness control member in the developing assembly shown in FIG. 1.

FIG. 2 schematically illustrates the construction of a developing assembly according to another embodiment of the present invention. FIG. 3 schematically illustrates the construction of a developing assembly according to still another embodiment of the present invention.

The developing assemblies shown in FIGS. 2 and 3 use an elastic control blade 11 comprised of a material having rubber elasticity, such as urethane rubber or silicone rubber, or a material having metal elasticity, such as phosphor bronze or stainless steel, as the developer layer thickness control member to control the layer thickness of the magnetic toner 4 on the developing sleeve 8. In the developing assembly shown in FIG. 2, this elastic control blade 11 is brought into press-contact with the developing sleeve 8 in the same direction as its rotational direction. In the developing assembly shown in FIG. 3, this elastic control blade 11 is brought into press-contact with the developing sleeve 8 in the direction reverse to its rotational direction. In these developing assemblies, the developer layer thickness control member is elastically brought into press-contact with the developing sleeve 8 through the developer layer to form the thin layer of the developer on the developing sleeve. Hence, a much thinner developer layer than the case aforementioned with reference to FIG. 1 can be formed on the developing sleeve 8.

The developing assemblies shown in FIGS. 2 and 3 have the same basic construction as the developing assembly shown in FIG. 1, and the same reference numerals denote basically the same members.

FIGS. 1 to 3 schematically exemplify the developing assembly of the present invention. Needless to say, there can be various modes of the shape of the developer container (the hopper 3), the presence or absence of the stirring member 10 and the arrangement of magnetic poles. As a matter of course, these assemblies can also be used in development employing a two component type developer comprised of a toner and a carrier.

An example of the image forming apparatus of the present invention will be described below with reference to FIG. 4.

The surface of a photosensitive drum 101 as an electrostatic image bearing member is negatively charged by a contact (roller) charging means 119 including a voltage applying means 120 as a primary charging means, and exposed to laser light 115 to form a digital latent image by image scanning. The latent image thus formed is developed by reversal development using a one component type developer having a magnetic toner, which is held in a developing assembly having equipped with an elastic control blade 111 and a developing sleeve 108 as a developer carrying member, internally provided with a magnet 105. In the developing zone, the conductive substrate of the photosensitive drum 101 is earthed, and an alternating bias, a pulse bias and/or a DC bias is/are applied to the developing sleeve 108 through a bias applying means 99. A recording medium P is fed and delivered to the transfer zone, where the recording medium P is electrostatically charged by a contact (roller) transfer means 113 serving as a transfer means, on its back surface (the reverse side with respect to the photosensitive drum side) through a voltage applying means 114, so that the developed image (toner image) on the surface of the photosensitive drum 101 is transferred to the recording medium P through the contact transfer means 113. The recording medium P separated from the photosensitive drum 101 is subjected to fixing using a heat-pressure roller fixing assembly 117 serving as a fixing means, in order to fix the toner image on the recording medium P.

The one component type developer 104 remaining on the photosensitive drum 101 after the step of transfer is removed by a cleaning means having a cleaning blade 118*a*. When the remaining one component type developer 104 is in a small quantity, the cleaning step may be omitted. After the cleaning, the residual charge on the surface of the photosensitive drum 101 is eliminated by erase exposure 116, and thus the procedure again starting from the charging step using the primary charging assembly 119 is repeated.

The photosensitive drum 101 (i.e., the latent image bearing member) comprises a photosensitive layer and a conductive substrate, and is rotated in the direction of an arrow. In the developing zone, the developing sleeve 108 formed of a non-magnetic cylinder, which is the developer carrying member, is rotated so as to move in the same direction as the surface movement of the photosensitive drum 101 in the developing zone. Inside the developing sleeve 108, a multipolar permanent magnet 105 (magnet roll) serving as a magnetic field generating means is provided in a non-rotatable state. The one component type developer 104 held in the developing assembly 103 is applied on the surface of the developing sleeve 108, and, for example, negative triboelectric charges are imparted to the magnetic toner as a result of the friction between its toner particles and the surface of the developing sleeve 108 and between particles of the magnetic toner. An elastic control blade 111 is also disposed so as to press the developing sleeve 108. Thus, the thickness of developer layer is controlled to be small (30 $\mu$m to 300 $\mu$m) and uniform so that a magnetic toner layer with a thickness smaller than the gap between the photosensitive drum 101 and the developing sleeve 108 in the developing zone is formed. The rotational speed of this developing sleeve 108 is regulated so that the peripheral speed of the developing sleeve 108 can be substantially equal or close to the peripheral speed of the photosensitive drum 101. In the developing zone, an AC bias or a pulse bias may be applied as development bias voltage, to the developing sleeve 108 through a bias means 99. This AC bias may have a frequency (f) of 200 to 4,000 Hz and a Vpp of 500 to 3,000 V.

When the magnetic toner is moved in the developing zone, the magnetic toner is moved to the side of the electrostatic latent image by the electrostatic force of the surface of the photosensitive drum 101 and the action of the development bias voltage such as AC bias or pulse bias.

In place of the elastic control blade 111, it is also possible to use a magnetic doctor blade made of a material such as iron.

Although the primary charging means has been described with reference to the charging roller as the contact charging means, it may also be a contact charging means such as a charging blade or a charging brush, as well as a non-contact corona charging means.

However, the contact charging means is preferred in view of less ozone caused by charging.

The transfer means has been described with reference to a contact transfer means such as the transfer roller, but it may also be a non-contact corona transfer means.

However, the contact transfer means is preferred in view of less ozone caused by charging.

Figure 5:
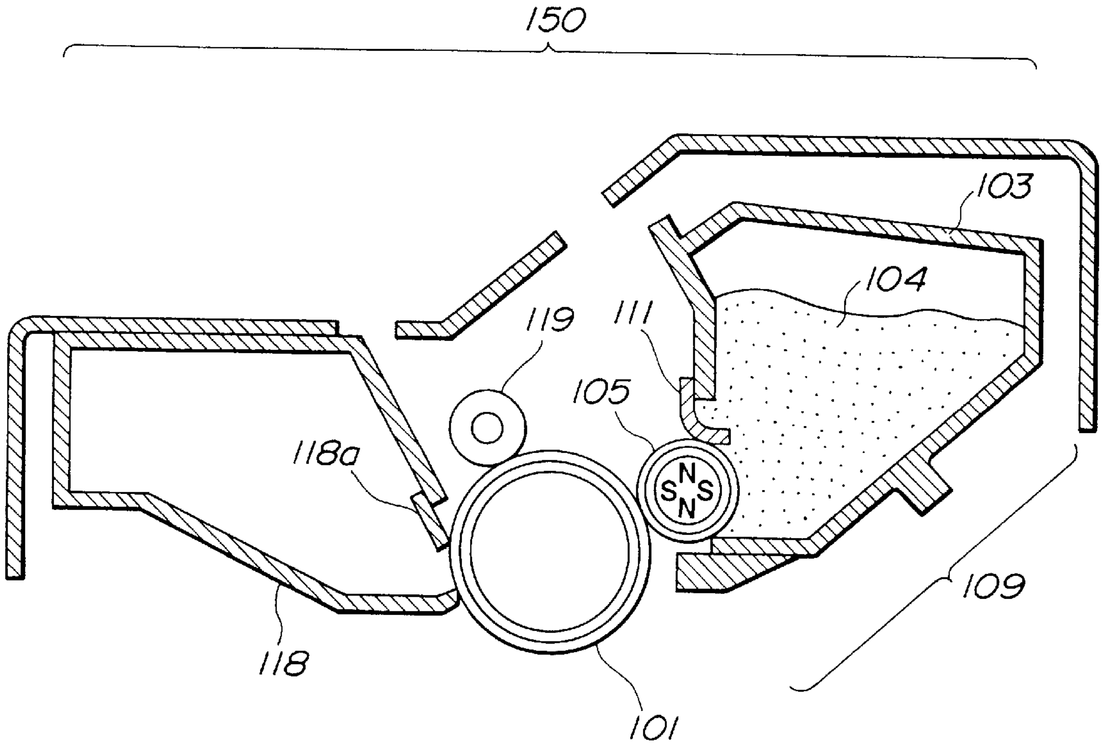
FIG. 5 is a schematic drawing illustrating an example of the process cartridge of the present invention.
Figure 6:
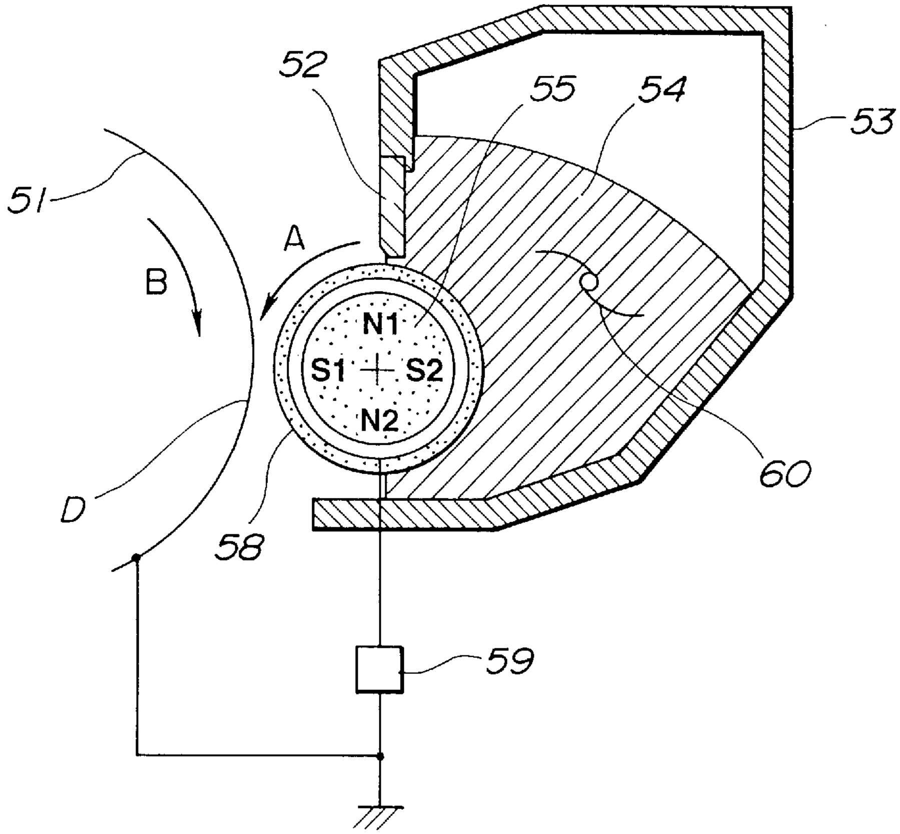
FIG. 6 is a schematic drawing illustrating a conventional developing assembly having a developer carrying member which has no resin coat layer.

FIG. 5 illustrates an embodiment of the process cartridge of the present invention.

Figure 4:
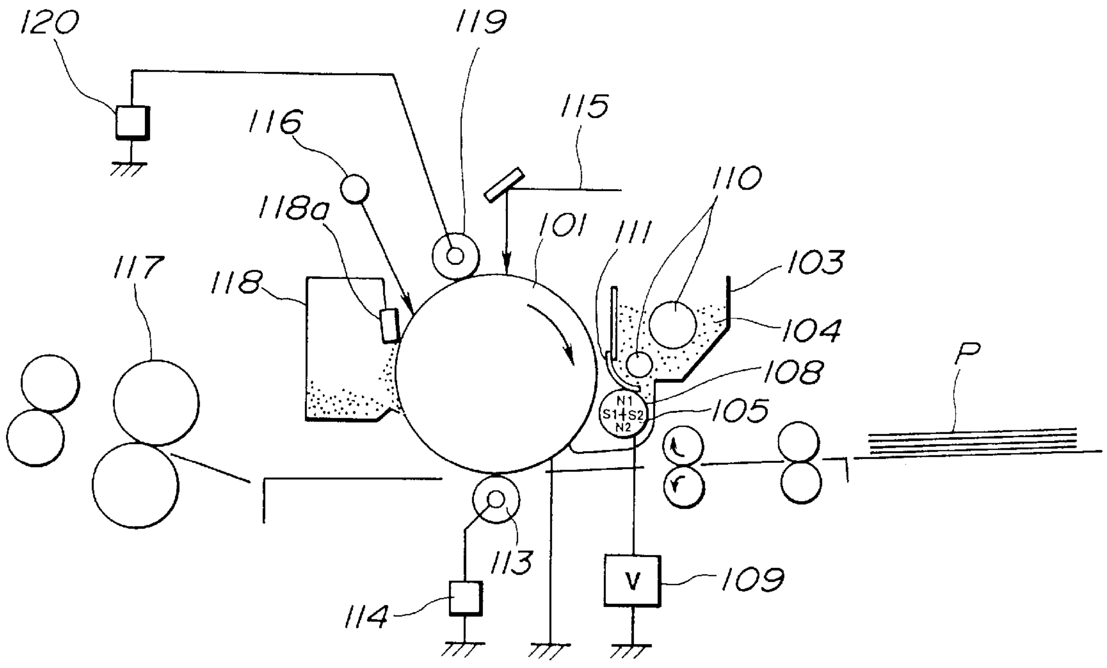
FIG. 4 is a schematic drawing illustrating an image forming apparatus of the present invention.

In the following description of the process cartridge, constituent members having the same functions as those in the image forming apparatus described with reference to FIG. 4 are denoted by the like reference numerals.

In the process cartridge of the present invention, at least the developing means and the latent image bearing member are joined together into one unit to be a cartridge, and the process cartridge is provided detachably in the body of the image forming apparatus (e.g., a copying machine, a laser beam printer or a facsimile machine).

In this embodiment, a process cartridge 150 is exemplified in which a developing means 121, a drum-like latent image bearing member (a photosensitive drum) 101, a cleaning means 118 having a cleaning blade 118*a* and a primary charging means (a charging roller) 119 are joined into one unit.

In this embodiment, the developing means 121 has in a developer container 103 a developing sleeve 108, an elastic blade 111 and a one component type developer 104 having a magnetic toner. At the time of development, a given electric field is formed between the photosensitive drum 101 and the developing sleeve 108 by applying a development bias voltage from a bias applying means, carrying out the developing step by the use of the developer. In order to preferably carry out this developing step, the distance between the photosensitive drum 101 and the developing sleeve 108 is very important.

In the above embodiment, the process cartridge has been described in which the four constituents, the developing means, the latent image bearing member, the cleaning means and the primary charging means, are joined together into one unit to be a cartridge. In the present invention, at least two constituents, the developing means and the latent image bearing member, are joined together into one unit to be a cartridge. Hence, three constituents consisting of the developing means, the latent image bearing member and the cleaning means, and three constituents consisting of the developing means, the latent image bearing member and the primary charging means, may be used while optionally adding other constituent(s), so that they are made together into one unit to constitute one cartridge.

The developer (toner) used to visualize the electrostatic latent image will be described below.

Toners to be contained in developers are generally classified into dry process toners and wet process toners. The wet process toners have a great problem concerning on the evaporation of solvents. Hence, at present, the dry process toners are prevailing. The toner is a fine powder chiefly obtained by melt-kneading materials such as a binder resin, a release agent, a charge control agent and a colorant, and cooling the kneaded product to solidify, followed by pulverization and classification to make particle size distribution uniform.

The binder resin used for the toner may include, for example, styrene, homopolymers of styrene or derivatives thereof such as α-methylstyrene and p-chlorostyrene; styrene copolymers such as a styrene-propylene copolymer, a styrene-vinyltoluene copolymer, a styrene-ethyl acrylate copolymer, a styrene-butyl acrylate copolymer, a styrene-octyl acrylate copolymer, a styrene-dimethylaminoethyl copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-methyl vinyl ether copolymer, a styrene-methyl vinyl ketone copolymer, a styrene-butadiene copolymer, a styrene-isoprene copolymer, a styrene-maleic acid copolymer, and a styrene-maleic acid ester copolymer; polymethyl methacrylate; polybutyl methacrylate; polyvinyl acetate; polyethylene; polypropylene; polyvinyl butyral; polyacrylic resins; rosin; modified rosins; terpene resins; phenol resins; aliphatic or alicyclic hydrocarbon resins; aromatic petroleum resins; paraffin wax; and carnauba wax; any of which may be used alone or in combination.

When the toner is used as a color toner (a non-magnetic toner), a dye or pigment may be contained as a colorant in the toner. The dye or pigment may include, for example, carbon black, Nigrosine dyes, lamp black, Sudan Black SM, Fast Yellow G. Benzidine Yellow, Pigment Yellow, Indian First Orange, Irgazine Red, Para Nitraniline Red, Toluidine Red, Carmine 6B, Permanent Bordeaux F3R, Pigment Orange R, Lithol Red 2G, Lake Red 2G, Rhodamine FB, Rhodamine B Lake, Methyl Violet B lake, Phthalocyanine Blue, Pigment Blue, Brilliant Green B, Phthalocyanine Green, Oil Yellow GG, Zapon First Yellow CGG, Kayaset Y963, Kayaset YG, Zapon First Orange RR, Oil Scarlet, Aurazole Brown B, Zapon First Scarlet CG, and Oil Pink OP, any of which may be used under appropriate selection.

When the toner is used as a magnetic toner, a magnetic powder is incorporated in the toner. As the magnetic powder, a material magnetizable when placed in a magnetic field is used. It may include, for example, powders of ferromagnetic metals such as iron, cobalt and nickel; and alloys or compounds such as magnetite, hematite and ferrite. Such a magnetic powder may preferably be in a content of approximately from 15 to 70% by weight based on the weight of the toner.

A release agent of various types is optionally added and incorporated in the toner. Such a release agent may include polyfluoroethylene, fluorine resins, fluorocarbon oil, silicone oil, low-molecular weight polyethylene, low-molecular weight polypropylene and various types of waxes. Further, if necessary, a charge control agent of various types may be added in order to make it easy for the toner to be charged positively or negatively.

In the present invention, the non-magnetic toner as described above may be blended with a carrier so as to be used as a two component type developer, or, without being blended with a carrier, may be used as a one component type developer.

In the present invention, the magnetic toner as described above may also be used as a one component type developer.

Physical properties concerned with the present invention are measured by the methods as described below.

(1) Measurement of centerline average height (Ra)

In accordance with the surface roughness in JIS B0601, values at six points each of (axial-direction three points) x (peripheral-direction two points) are measured using Surfcoader SE-3300, manufactured by Kosaka Kenkyusho, and the average of the values is calculated.

(2) Measurement of volume resistivity of particles

Sample particles are put in an aluminum ring of 40 mm diameter, and press-molded under 2,500N and the volume resistivity of the molded product is measured by means of a resistivity meter LOW-RESTAR or HI-RESTAR (manufactured by Mitsubishi Petrochemical Engineering Co., Ltd.), using a four-terminal probe. The measurement is made in an environment of 20° to 25° C. and 50 to 60% RH.

(3) Measurement of volume resistivity of coat layer

A conductive coat layer of 7 to 20 μm thick is formed on a PET sheet of 100 μm thick, and its resistivity is measured using a voltage drop type digital ohmmeter (manufactured by Kawaguchi Denki Seisakusho). The measurement is made under environmental conditions of 20° to 25° C. and 50 to 60% RH.

(4) Measurement of true density of spherical particles

True density of the conductive spherical particles used in the present invention is measured using a dry densitometer ACUPIC 1330 (manufactured by Shimadzu Corporation).

(5) Measurement of particle diameter of spherical particles

Measurement is made using a Coulter Model LS-130 particle size distribution meter (manufactured by Coulter Electronics Inc.), which is a laser diffraction particle size distribution meter. Number average particle diameter calculated from a number distribution is obtained.

(6) Measurement of particle diameter of conductive fine particles

Particle diameters of conductive fine particles are measured using an electron microscope. A photograph is taken at 60,000 magnification. If this is too difficult, a photograph taken at a lower magnification is enlarged so as to be 60,000 magnification. On the photograph, particle diameters of primary particles are measured. Here, major axes and minor axes are measured, and the average of the values measured is regarded as particle diameter. This measurement is carried out for 100 particles, and the 50% value is regarded as average particle diameter.

(7) Coating weight of conductive coat layer

Using an electron balance, the weight is determined from a difference in weight before and after formation of the conductive coat layer on the developer carrying member.

(8) Measurement of particle diameter of toner

Measurement is made using a Coulter counter Multisizer II (manufactured by Coulter Electronics Inc.). Weight average particle diameter based on the weight calculated from volume distribution is determined.

As described above, compared with developer carrying members conventionally used, the present invention enables more improved running performance (or durability) and maintenance of such a state that good images can be provided over a long period of time. Thus, according to the present invention, the conductive coat layer on the surface of the developer carrying member is hardly deteriorated by, for example, wear and toner contamination due to repeated copying or running. On account of such a highly durable developer carrying member, high-grade images free of decrease in image density and occurrence of ghost and fogging can be provided over a long period of time.

EXAMPLES

The present invention will be described below in detail by giving Examples and Comparative Examples. The following Examples by no means limit the present invention. In the following Examples and Comparative Examples, "%" and "part(s)" are by weight in all occurrences unless particularly noted.

Example 1

The 100 parts of spherical phenol resin particles with a number average particle diameter of 10 μm was uniformly coated with 14 parts of coal bulk-mesophase pitch powder with a number average particle diameter smaller than 3 μm by means of an automated mortar (manufactured by Ishikawa Kogyo). Thereafter, the coated particles were subjected to thermal stabilization treatment in an oxidative atmosphere, followed by firing at 2,200° C. and graphitizing to give spherical, conductive carbon particles, which were used as conductive spherical particles A-1 . Physical properties of the conductive spherical particles A-1 are shown in Table 1.

| | |
|---|---|
| Resol type phenol resin solution (containing 50% of methanol) | 200 parts |
| Graphite with number average particle diameter of 6.1 μm | 45 parts |
| Conductive carbon black | 5 parts |
| Isopropyl alcohol | 130 parts |

To the above materials, zirconia beads of 1 mm diameter were added as media particles, and the dispersed for 2 hours by means of a sand mill, followed by separation of the zirconia beads through a sieve to give base solution B-1.

To 380 parts of the base solution B-1 thus prepared, 10 parts of the conductive spherical particles A-1 were added, and isopropyl alcohol was added so as to provide a solid matter concentration of 32%. Thereafter, the particles were dispersed for 1 hour with addition of glass beads of 3 mm diameter, followed by separation of the glass beads through a sieve to obtain a coating solution.

Using this coating solution, a conductive coat layer was formed by spraying on a cylinder of 16 mm diameter, made of aluminum. Subsequently, the coated cylinder was heated at 150° C. for 30 minutes by means of a hot air drying oven to cure the conductive coat layer. Thus, developer carrying member C-1 was produced. The conductive coat layer after drying was in a coating weight of 100 mg. Physical properties of the conductive coat layer of this developer carrying member C-1 are shown in Table 2.

The developer carrying member C-1 was used in a laser beam printer LASER JET III Si sold by or available from Hewlett Packard Co.) as the image forming apparatus shown in FIG. 4, having the developing assembly shown in FIG. 3. Using this apparatus, a running evaluation test (examination for durability in operation for a long period of time) was carried out for the developer carrying member while feeding a one component type developer.

The following was used as the one component type developer.

| | |
|---|---|
| Styrene-acrylic resin | 100 parts |
| Magnetite | 80 parts |
| Chromium complex of 3,5-di-tert-butylsalicylic acid | 2 parts |
| Low-molecular weight polypropylene | 4 parts |

Using the above materials, kneading, pulverization and classification were carried out by a dry-process toner production process commonly used, obtaining a fine powder (toner particles) with a number average particle diameter of 6.9 μm. To 100 parts of this fine powder, 1.0 part of hydrophobic colloidal silica was externally added to prepare a magnetic toner. This magnetic toner was used as the above one component type developer.

The image forming apparatus used in the present Example has the constitution that the process cartridge comprised of the latent image bearing member, the developing means, the cleaning means and the primary charging means which are joined into one unit as a cartridge is detachably mounted on the body of the image forming apparatus.

Example 2

The 100 parts of spherical phenol resin particles with a number average particle diameter of 4.8 μm was coated uniformly with 14 parts of coal bulk-mesophase pitch powder with a number average particle diameter smaller than 1 μm by means of an automated mortar (manufactured by Ishikawa Kogyo). The coated particles were subjected to thermal stabilization treatment in an oxidative atmosphere, followed by firing at 2,200° C. and graphitizing to give spherical, conductive carbon particles, which were used as conductive spherical particles A-2 . Physical properties of the conductive spherical particles A-2 are shown in Table 1.

The subsequent procedure in Example 1 was repeated except that 25 parts of the conductive spherical particles A-2 were added to 380 parts of the base solution B-1 as prepared in Example 1, to produce developer carrying member C-2 . The conductive coat layer after drying was in a coating weight of 105 mg. Physical properties of the conductive coat layer of this developer carrying member C-2 are shown in Table 2.

The developer carrying member C-2 was used in the same image forming apparatus as in Example 1. In the same manner as in Example 1, a running evaluation test was carried out for the developer carrying member while feeding the one component type developer.

Example 3

The 100 parts of spherical phenol resin particles with a number average particle diameter of 26 μm was coated uniformly with 14 parts of coal bulk-mesophase pitch powder with a number average particle diameter smaller than 4 μm by means of an automated mortar (manufactured by Ishikawa Kogyo). The coated particles were subjected to thermal stabilization treatment in an oxidative atmosphere, followed by firing at 2,200° C. and graphitizing to give spherical, conductive carbon particles, which were used as conductive spherical particles A-3. Physical properties of the conductive spherical particles A-3 are shown in Table 1.

The subsequent procedure in Example 1 was repeated except that 6 parts of the conductive spherical particles A-3 were added to 380 parts of the base solution B-1 as prepared in Example 1, to produce developer carrying member C-3. The conductive coat layer after drying was in a coating weight of 100 mg.

Physical properties of the conductive coat layer of this developer carrying member C-3 are shown in Table 2.

The C-3 developer carrying member was used in the same image forming apparatus as in Example 1. In the same manner as in Example 1, a running evaluation test was carried out for the developer carrying member while feeding the one component type developer.

Example 4

The 100 parts of spherical phenol resin particles with a number average particle diameter of 10 μm was coated uniformly with 14 parts of coal bulk-mesophase pitch powder with a number average particle diameter smaller than 3 μm by means of an automated mortar (manufactured by Ishikawa Kogyo) in the same manner as in Example 1. The coated particles were subjected to thermal stabilization treatment in an oxidative atmosphere, followed by firing at 1,000° C. and carbonizing to give spherical, conductive carbon particles, which were used as conductive spherical particles A-4. Physical properties of the conductive spherical particles A-4 are shown in Table 1.

The subsequent procedure in Example 1 was repeated except that 10 parts of the conductive spherical particles A-4 were added to 380 parts of the base solution B-1 as prepared in Example 1, to produce developer carrying member C-4 . The conductive coat layer after drying was in a coating weight of 95 mg. Physical properties of the conductive coat layer of this developer carrying member C-4 are shown in Table 2.

The developer carrying member C-4 was used in the same image forming apparatus as in Example 1. In the same manner as in Example 1, a running evaluation test was carried out for the developer carrying member while feeding the one component type developer.

Example 5

Spherical phenol resin particles with a number average particle diameter of 10.0 μm were subjected, as they were, to thermal stabilization treatment in an oxidative atmosphere, followed by firing at 2,200° C. and graphitizing to give spherical, conductive carbon particles, which were used as conductive spherical particles A-5 . Physical properties of the conductive spherical particles A-5 are shown in Table 1.

The subsequent procedure in Example 1 was repeated except that 10 parts of the conductive spherical particles A-5 were added to 380 parts of the base solution B-1 as prepared in Example 1, to produce developer carrying member C-5 . The conductive coat layer after drying was in a coating weight of 100 mg. Physical properties of the conductive coat layer of this developer carrying member C-5 are shown in Table 2.

The C-5 developer carrying member was used in the same image forming apparatus as in Example 1. In the same manner as in Example 1, a running evaluation test was carried out for the developer carrying member while feeding the one component type developer.

Example 6

Spherical phenol resin particles with a number average particle diameter of 10.3 μm were subjected, as they were, to thermal stabilization treatment in an oxidative atmosphere, followed by firing at 1,000° C. and carbonizing to give spherical, conductive carbon particles, which were used as conductive spherical particles A-6 . Physical properties of the conductive spherical particles A-6 are shown in Table 1.

The subsequent procedure in Example 1 was repeated except that 10 parts of the conductive spherical particles A-6 were added to 380 parts of the base solution B-1 as prepared in Example 1, to produce developer carrying member C-6 . The conductive coat layer after drying was in a coating weight of 95 mg. Physical properties of the conductive coat layer of this developer carrying member C-6 are shown in Table 2.

The C-6 developer carrying member was used in the same image forming apparatus as in Example 1. In the same manner as in Example 1, a running evaluation test was carried out for the developer carrying member while feeding the one component type developer.

Example 7

The 100 parts of spherical divinylbenzene polymer particles with a number average particle diameter of 10.2 μm was uniformly coated with 14 parts of petroleum bulk-mesophase pitch powder with a number average particle diameter smaller than 3 μm by means of an automated mortar (manufactured by Ishikawa Kogyo). The coated particles were subjected to thermal stabilization treatment in an oxidative atmosphere, followed by firing at 2,000° C. and graphitizing to give spherical, conductive carbon particles, which were used as conductive spherical particles A-7 . Physical properties of the conductive spherical particles A-7 are shown in Table 1.

The subsequent procedure in Example 1 was repeated except that 10 parts of the conductive spherical particles A-7 were added to 380 parts of the base solution B-1 as prepared in Example 1, to produce developer carrying member C-7 . The conductive coat layer after drying was in a coating weight of 105 mg. Physical properties of the conductive coat layer of this developer carrying member C-7 are shown in Table 2.

The C-7 developer carrying member was used in the same image forming apparatus as in Example 1. In the same manner as in Example 1, a running evaluation test was carried out for the developer carrying member while feeding the one component type developer.

Example 8

On 100 parts of the same conductive spherical particles as used in Example 4, 100 parts of copper and silver was deposited to give metal-coated carbon particles, which were used as conductive spherical particles A-8 . Physical properties of the conductive spherical particles A-8 are shown in Table 1.

The subsequent procedure in Example 1 was repeated except that 10 parts of the conductive spherical particles A-8 were added to 380 parts of the base solution B-1 as prepared in Example 1, to produce developer carrying member C-8 . Its conductive coat layer after drying was in a coating weight of 110 mg. Physical properties of the conductive coat layer of this developer carrying member C-8 are shown in Table 2.

The developer carrying member C-8 was used in the same image forming apparatus as in Example 1. In the same manner as in Example 1, a running evaluation test was carried out for the developer carrying member while feeding the one component type developer.

Example 9

The 100 parts of spherical PMMA particles with a number average particle diameter of 11.5 μm was coated with 5 parts of conductive carbon black by means of a hybridizer (manufactured by Nara Kikai) to give spherical resin particles subjected to conducting treatment, which were used as conductive spherical particles A-9 . Physical properties of the conductive spherical particles A-9 are shown in Table 1.

The subsequent procedure in Example 1 was repeated except that 10 parts of the conductive spherical particles A-9 were added to 380 parts of the base solution B-1 as prepared in Example 1, to produce developer carrying member C-9 . The conductive coat layer after drying was in a coating weight of 100 mg. Physical properties of the conductive coat layer of this developer carrying member C-9 are shown in Table 2.

The C-9 developer carrying member was used in the same image forming apparatus as in Example 1. In the same manner as in Example 1, a running evaluation test was carried out for the developer carrying member while feeding the one component type developer.

Example 10

The 100 parts of spherical PMMA particles with a number average particle diameter of 11.5 $\mu$m was coated with 20 parts of fine conductive zinc oxide particles by means of a hybridizer (manufactured by Nara Kikai) to give spherical resin particles subjected to conducting treatment, which were used as conductive spherical particles A-10 . Physical properties of the conductive spherical particles A-10 are shown in Table 1.

The subsequent procedure in Example 1 was repeated except that 10 parts of the conductive spherical particles A-10 were added to 380 parts of the base solution B-1 as prepared in Example 1, to produce developer carrying member C-10 The conductive coat layer after drying was in a coating weight of 105 mg. Physical properties of the conductive coat layer of this developer carrying member C-10 are shown in Table 2.

The C-10 developer carrying member was used in the same image forming apparatus as in Example 1. In the same manner as in Example 1, a running evaluation test was carried out for the developer carrying member while feeding the one component type developer.

Example 11

The 100 parts of spherical nylon particles with a number average particle diameter of 11.0 $\mu$m was coated with 18 parts of conductive graphite by means of a hybridizer (manufactured by Nara Kikai) to give spherical resin particles subjected to conducting treatment, which were used as conductive spherical particles A-11 . Physical properties of the conductive spherical particles A-11 are shown in Table 1.

The subsequent procedure in Example 1 was repeated except that 10 parts of the conductive spherical particles A-11 were added to 380 parts of the B-1 base solution as prepared in Example 1, to produce developer carrying member C-11 . The conductive coat layer after drying was in a coating weight of 100 mg. Physical properties of the conductive coat layer of this developer carrying member C-11 are shown in Table 2.

The C-11 developer carrying member was used in the same image forming apparatus as in Example 1. In the same manner as in Example 1, a running evaluation test was carried out for the developer carrying member while feeding the one component type developer.

Example 12

Using the materials shown below, kneading, pulverization and classification were carried out to prepare conductive particles with a number average particle diameter of 15.6 $\mu$m. Thereafter, the particles were made spherical by means of a hybridizer (manufactured by Nara Kikai) to give conductive spherical resin particles, which were used as conductive spherical particles A-12 . Physical properties of the conductive spherical particles A-12 are shown in Table 1.

| | |
|---|---|
| Styrene/dimethylaminoethyl methacrylate/divinylbenzene copolymer (copolymerization ratio: 90:10:0.05) | 100 parts |
| Conductive carbon black | 25 parts |

The subsequent procedure in Example 1 was repeated except that 10 parts of the conductive spherical particles A-12 were added to 380 parts of the base solution B-1 as prepared in Example 1, to produce developer carrying member C-12 . The conductive coat layer after drying was in a coating weight of 95 mg. Physical properties of the conductive coat layer of this developer carrying member C-12 are shown in Table 2.

The C-12 developer carrying member was used in the same image forming apparatus as in Example 1. In the same manner as in Example 1, a running evaluation test was carried out for the developer carrying member while feeding the one component type developer.

Example 13

Using the materials shown below, kneading, pulverization and classification were carried out to prepare conductive particles with a number average particle diameter of 13.1 $\mu$m. Thereafter, the particles were made spherical by means of a hybridizer (manufactured by Nara Kikai) to give conductive spherical resin particles, which were used as conductive spherical particles A-13 . Physical properties of the conductive spherical particles A-13 are shown in Table 1.

| | |
|---|---|
| Styrene/dimethylaminoethyl methacrylate/divinylbenzene copolymer (copolymerization ratio: 90:10:0.05) | 100 parts |
| Conductive titanium oxide | 50 parts |

The subsequent procedure in Example 1 was repeated except that 10 parts of the conductive spherical particles A-13 were added to 380 parts of the base solution B-1 as prepared in Example 1, to produce developer carrying member C-13 . Its conductive coat layer after drying was in a coating weight of 100 mg. Physical properties of the conductive coat layer of this developer carrying member C-13 are shown in Table 2.

The C-13 developer carrying member was used in the same image forming apparatus as in Example 1. In the same manner as in Example 1, a running evaluation test was carried out for the developer carrying member while feeding the one component type developer.

Example 14

Using the materials shown below, kneading, pulverization and classification were carried out to prepare conductive particles with a number average particle diameter of 10.5 $\mu$m. Thereafter, the particles were made spherical by means of a hybridizer (manufactured by Nara Kikai) to give conductive spherical resin particles, which were used as conductive spherical particles A-14 . Physical properties of the conductive spherical particles A-14 are shown in Table 1.

| | |
|---|---|
| Styrene/dimethylaminoethyl methacrylate/divinylbenzene copolymer (copolymerization ratio: 90:10:0.05) | 100 parts |
| Fine silver particles | 50 parts |

The subsequent procedure in Example 1 was repeated except that 10 parts of the conductive spherical particles A-14 were added to 380 parts of the base solution B-1 as prepared in Example 1, to produce developer carrying member C-14 . The conductive coat layer after drying was in a coating weight of 105 mg. Physical properties of the conductive coat layer of this developer carrying member C-14 are shown in Table 2.

The C-14 developer carrying member was used in the same image forming apparatus as in Example 1. In the same manner as in Example 1, a running evaluation test was carried out for the developer carrying member while feeding the one component type developer.

Example 15

| | |
|---|---|
| Resol type phenol resin solution (containing 50% of methanol) | 200 parts |
| Conductive carbon black | 20 parts |
| Isopropyl alcohol | 130 parts |

To the above materials, zirconia beads of 1 mm diameter were added as media particles, and the materials were dispersed for 2 hours by means of a sand mill, followed by separation of the zirconia beads through a sieve to obtain base solution B-2.

The subsequent procedure in Example 1 was repeated except that 10 parts of the conductive spherical particles A-1 were added to 380 parts of the base solution B-2 thus prepared, to produce developer carrying member C-15 . The conductive coat layer after drying was in a coating weight of 100 mg. Physical properties of the conductive coat layer of this developer carrying member C-15 are shown in Table 2.

The C-15 developer carrying member was used in the same image forming apparatus as in Example 1. In the same manner as in Example 1, a running evaluation test was carried out for the developer carrying member while feeding the one component type developer.

Example 16

| | |
|---|---|
| PMMA resin solution (containing 50% of methanol) | 200 parts |
| Graphite with number average particle diameter of 6.1 μm | 45 parts |
| Conductive carbon black | 5 parts |
| Toluene | 130 parts |

To the above materials, zirconia beads of 1 mm diameter were added as media particles, and the materials were dispersed for 2 hours by means of a sand mill, followed by separation of the zirconia beads through a sieve to obtain base solution B-3.

The subsequent procedure in Example 1 was repeated except that 10 parts of the conductive spherical particles A-1 were added to 380 parts of the base solution B-3 thus prepared, to produce developer carrying member C-16 . The conductive coat layer after drying was in a coating weight of 105 mg. Physical properties of the conductive coat layer of this developer carrying member C-16 are shown in Table 2.

The C-16 developer carrying member was used in the same image forming apparatus as in Example 1. In the same manner as in Example 1, a running evaluation test was carried out for the developer carrying member while feeding the one component type developer.

Example 17

| | |
|---|---|
| Resol type phenol resin solution (containing 50% of methanol) | 200 parts |
| Graphite with number average particle diameter of 1.5 μm | 30 parts |
| Conductive carbon black | 5 parts |
| Isopropyl alcohol | 130 parts |

To the above materials, zirconia beads of 1 mm diameter were added as media particles, and the materials were dispersed for 2 hours by means of a sand mill, followed by separation of the zirconia beads through a sieve to give base solution B-4.

To 380 parts of the base solution B-4 thus prepared, 15 parts of the conductive spherical particles A-2 as used in Example 2 were added, and isopropyl alcohol was added so as to provide a solid matter concentration of 32%. Thereafter, the particles were dispersed for 1 hour with addition of glass beads of 3 mm diameter, followed by separation of the glass beads through a sieve to give a coating solution.

Using this coating solution, a conductive coat layer was formed by spraying on a cylinder of 32 mm diameter, made of aluminum. Subsequently, the coated cylinder was heated at 140° C. for 30 minutes by means of a hot air drying oven to cure the conductive coat layer. Thus, developer carrying member C-17 was produced. The conductive coat layer after drying was in a coating weight of 265 mg. Physical properties of the conductive coat layer of this developer carrying member C-17 are shown in Table 2.

The developer carrying member C-17 was used in a copying machine NP-6060 (manufactured by CANON INC.) as the image forming apparatus shown in FIG. 4 (corona charging means, corona transfer means), having the developing assembly shown in FIG. 1. Using this apparatus, a running evaluation test was carried out for the developer carrying member while feeding a one component type developer.

The following was used as the one component type developer.

| | |
|---|---|
| Polyester resin | 100 parts |
| Magnetite | 100 parts |
| Chromium complex of 3,5-di-tert-butylsalicylic acid | 2 parts |
| Low-molecular weight polypropylene | 4 parts |

Using the above materials, kneading, pulverization and classification were carried out by a toner production dry-process commonly used, to prepare a fine powder (toner particles) with a number average particle diameter of 6.6 μm. To 100 parts of this fine powder, 1.2 parts of hydrophobic colloidal silica was externally added to give a magnetic toner. This magnetic toner was used as the above one component type developer.

Comparative Example 1

The procedure of Example 1 was repeated except that, in place of the conductive spherical particles A-1, 10 parts of amorphous graphite a-1 with a number average particle diameter of 17.0 μm was added to 380 parts of the base solution B-1 as prepared in Example 1, to produce developer carrying member D-1 . The conductive coat layer after druing was in a coating weight of 100 mg. Physical properties of the conductive coat layer of this developer carrying member D-1 are shown in Table 2.

The D-1 developer carrying member was used in the same image forming apparatus as in Example 1. In the same manner as in Example 1, a running evaluation test was carried out for the developer carrying member while feeding the one component type developer.

Comparative Example 2

The procedure of Example 1 was repeated except that, in place of the conductive spherical particles A-1, 10 parts of non-conductive spherical PMMA particles a-2 with a number average particle diameter of 11.5 μm were added to 380 parts of the base solution B-1 as prepared in Example 1, to produce developer carrying member D-2. The conductive coat layer after drying was in a coating weight of 100 mg. Physical properties of the conductive coat layer of this developer carrying member D-2 are shown in Table 2.

The developer carrying member D-2 was used in the same image forming apparatus as in Example 1. In the same manner as in Example 1, a running evaluation test was carried out for the developer carrying member while feeding the one component type developer.

Comparative Example 3

The 100 parts of spherical phenol resin particles with a number average particle diameter of 37 μm was coated uniformly with 16 parts of coal bulk-mesophase pitch powder with a number average particle diameter smaller than 4 μm by means of an automated mortar (manufactured by Ishikawa Kogyo). The coated particles were subjected to thermal stabilization treatment in an oxidative atmosphere, followed by firing at 2,200° C. and graphitizing to give spherical, conductive carbon particles, which were used as conductive spherical particles a-3 . Physical properties of the conductive spherical particles a-3 were as shown in Table 1; the conductive spherical particles a-3 had a number average particle diameter of 35 μm.

The subsequent procedure in Example 1 was repeated except that 5 parts of the conductive spherical particles a-3 were added to 380 parts of the base solution B-1 as prepared in Example 1, to produce developer carrying member D-3. The conductive coat layer after drying was in a coating weight of 105 mg. Physical properties of the conductive coat layer of this developer carrying member D-3 are shown in Table 2.

The developer carrying member D-3 was used in the same image forming apparatus as in Example 1. In the same manner as in Example 1, a running evaluation test was carried out for the developer carrying member while feeding the one component type developer.

Comparative Example 4

The 100 parts of spherical PMMA particles with a number average particle diameter of 0.19 μm was coated 25 parts of conductive carbon black by means of a hybridizer (manufactured by Nara Kikai) to give spherical, conductive-treated resin particles, which were used as conductive spherical particles a-4 . Physical properties of the conductive spherical particles a-4 were as shown in Table 1; the conductive spherical particles a-3 had a number average particle diameter of 0.23 μm.

The subsequent procedure in Example 1 was repeated except that, in place of the conductive spherical particles A-1, 35 parts of the conductive spherical particles a-4 were added to 380 parts of the base solution B-1 as prepared in Example 1, to produce developer carrying member D-4 . The conductive coat layer after drying was in a coating weight of 105 mg. Physical properties of the conductive coat layer of this developer carrying member D-4 are shown in Table 2.

The developer carrying member D-4 was used in the same image forming apparatus as in Example 1. In the same manner as in Example 1, a running evaluation test was carried out for the developer carrying member while feeding the one component type developer.

Comparative Example 5

Using the materials shown below, kneading, pulverization and classification were carried out to prepare conductive particles with a number average particle diameter of 10.7 μm. Thereafter, the particles were made spherical by means of a hybridizer (manufactured by Nara Kikai) to give conductive spherical resin particles, which were used as conductive spherical particles a-5. Physical properties of the conductive spherical particles A-5 were as shown in Table 1; the true density thereof was 3.35 g/cm$^3$.

| | |
|---|---|
| Styrene/dimethylaminoethyl methacrylate/divinylbenzene copolymer (copolymerization ratio: 90:10:0.05) | 100 parts |
| Fine silver particles | 300 parts |

The subsequent procedure in Example 1 was repeated except that, in place of the conductive spherical particles A-1, 10 parts of the conductive spherical particles a-5 were added to 380 parts of the base solution B-1 as prepared in Example 1, to produce developer carrying member D-5. The conductive coat layer after drying was in a coating weight of 105 mg. Physical properties of the conductive coat layer of this developer carrying member D-5 are shown in Table 2.

The developer carrying member D-5 was used in the same image forming apparatus as in Example 1. In the same manner as in Example 1, a running evaluation test was carried out for the developer carrying member while feeding the one component type developer.

Comparative Example 6

Using the materials shown below, kneading, pulverization and classification were carried out to give conductive amorphous particles with a number prepare particle diameter of 15.6 μm. Physical properties of the conductive spherical particles a-6 are shown in Table 1.

| | |
|---|---|
| Styrene/dimethylaminoethyl methacrylate/divinylbenzene copolymer (copolymerization ratio: 90:10:0.05) | 100 parts |
| Conductive carbon black | 25 parts |

The subsequent procedure in Example 1 was repeated except that, in place of the conductive spherical particles A-1, 10 parts of the conductive amorphous particles a-6 were added to 380 parts of the base solution B-1 as prepared in Example 1, to produce developer carrying member D-6. The conductive coat layer after drying was in a coating weight of 95 mg. Physical properties of the conductive coat layer of this developer carrying member D-6 are shown in Table 2.

The developer carrying member D-6 was used in the same image forming apparatus as in Example 1. In the same manner as in Example 1, a running evaluation test was carried out for the developer carrying member while feeding the one component type developer.

Comparative Example 7

The procedure of Example 17 was repeated except that, in place of the conductive spherical particles A-2, 15 parts of amorphous graphite with a number average particle diameter of 4.0 μm was added to 380 parts of the base solution B-4 as prepared in Example 17, to produce developer carrying member D-7 . The conductive coat layer after drying was in a coating weight of 270 mg. Physical properties of the conductive coat layer of this developer carrying member D-7 are shown in Table 2.

The developer carrying member D-7 was used in the same image forming apparatus as in Example 17. In the same manner as in Example 17, a running evaluation test was carried out for the developer carrying member while feeding the one component type developer.

Evaluation

Evaluation was made for each developer carrying member by the evaluation method as shown below. Table 3 shows the results of evaluation for durability of image density, and running fogging and ghost (which may occur after operation over a long period of time) in a low temperature and low humidity environment in respect of Examples and Comparative Examples. The results of evaluation for durability of image density, running fog and running ghost in environment of high temperature and high humidity in respect of Examples and Comparative Examples are shown in Table 4. The results of evaluation for wear resistance and anti-contamination properties in respect of Examples and Comparative Examples are shown in Table 5.

Evaluation Method (1) A running test was made under environmental conditions of low temperature and low humidity (L/L) of 15° C./10% RH.

(2) A running test was also made under environmental conditions of high temperature and high humidity of 32.5° C./85% RH.

(3) Image density

To evaluate image density, the density of solid black areas on solid-printing was measured using a reflection densitometer RD918 (manufactured by Macbeth Co.) (Average value of five-point measurement).

(4) Fog density

Reflectance (D1) at solid white areas on recording paper on which images were formed was measured, and reflectance (D2) on virgin recording paper of the same cut as the recording paper used in image formation was also measured. A value of D1–D2 was regarded as fog density (Average value of five-point measurement). The reflectance was measured using TC-6 DS (manufactured by Tokyo Denshoku Co.)

(5) Ghost

The position on the developing sleeve at which a latent image having a solid white area and solid black area adjacent to each other was developed was so made as to come to the development position at the next round of the developing sleeve, developing a latent halftone image, where a density difference appearing on the developed halftone image were evaluated by visual observation according to the following criteria.

A: No density difference is observed at all.

AB: A slight shade difference is observed.

B: A density difference is observed a little, but allowable in practical use.

C: Shade differences are conspicuous, and not allowable in practical use.

(6) Wear resistance of the conductive coat layer

Center-line average height (Ra) of the surface of the developer carrying member was measured before and after running.

(7) Anti-contamination properties of the conductive coat layer

The surface of the developer carrying member was observed by SEM after the running, and the degree of toner contamination was evaluated according to the following criteria.

A: A slight contamination is observed.

AB: Contamination is a little observed.

B: Contamination is partly observed.

C: Contamination is conspicuous.

TABLE 1

Physical Properties of Added Particles Constituting Resin Coat Layer

| Particles | Constitution | (1) (μm) | True density (g/cm³) | Volume resistivity (Ω · cm) | Shape (axis ratio)* |
|---|---|---|---|---|---|
| A-1 | Carbon particles | 9.1 | 1.48 | $8.2 \times 10^{-2}$ | Spherical (1.16) |
| A-2 | Carbon particles | 4.2 | 1.52 | $7.4 \times 10^{-2}$ | Spherical (1.18) |
| A-3 | Carbon particles | 24 | 1.45 | $9.5 \times 10^{-2}$ | Spherical (1.15) |
| A-4 | Carbon particles | 9.4 | 1.44 | $2.3 \times 10^{-1}$ | Spherical (1.13) |
| A-5 | Carbon particles | 8.9 | 1.35 | $3.3 \times 10^{-1}$ | Spherical (1.08) |
| A-6 | Carbon particles | 8.7 | 1.35 | $7.0 \times 10^{-1}$ | Spherical (1.05) |
| A-7 | Carbon particles | 9.3 | 1.47 | $8.1 \times 10^{-2}$ | Spherical (1.14) |
| A-8 | Carbon particles-coated with Cu & Ag | 10.0 | 2.50 | 3.2 × 10–5 | Spherical (1.06) |
| A-9 | PMMA particles coated with carbon black | 11.8 | 1.21 | 1.5 × 100 | Spherical (1.07) |
| A-10 | Nylon particles coated with conductive tin oxide | 11.6 | 1.37 | 5.0 × 100 | Spherical (1.06) |
| A-11 | Nylon particles coated with graphite | 12.0 | 1.28 | $9.4 \times 10^{-2}$ | Spherical (1.02) |
| A-12 | Carbon black-dispersed resin particles | 15.0 | 1.21 | $1.8 \times 10^{1}$ | Spherical (1.22) |
| A-13 | Conductive tin oxide-dispersed resin particles | 13.5 | 1.46 | $9.4 \times 10^{2}$ | Spherical (1.23) |
| A-14 | Fine silver particle-dispersed resin particles | 11.0 | 2.70 | $2.3 \times 10^{-2}$ | Spherical (1.21) |
| a-1 | Graphite particles | 17.0 | 2.25 | $3.5 \times 10^{-2}$ | Amorphous (2.2) |
| a-2 | PMMA particles | 11.5 | 1.19 | $\geqq 10^{15}$ | Spherical (1.06) |
| a-3 | Carbon particles | 35.0 | 1.45 | $9.4 \times 10^{-2}$ | Spherical (1.16) |
| a-4 | PMMA particles coated with carbon black | 0.23 | 1.29 | $1.1 \times 10^{0}$ | Spherical (1.08) |
| a-5 | Fine silver particle-dispersed resin particles | 11.3 | 3.35 | $2.5 \times 10^{-4}$ | Spherical (1.23) |
| a-6 | Carbon black-dispersed resin particles | 15.6 | 1.21 | $1.6 \times 10^{1}$ | Amorphous (1.54) |
| a-7 | Graphite particles | 4.0 | 2.25 | $3.5 \times 10^{-2}$ | Amorphous (2.00) |

(1): Number average particle diameter
*(major/minor axis ratio)

TABLE 2

| Physical Properties of Coat Layer of Developer Carrying Member | | | | |
|---|---|---|---|---|
| Developer carrying member | Particles added in conductive coat layer | Conductive coat layer coating weight (mg) | Ra ($\mu$m) | Volume resistivity ($\Omega \cdot$ cm) |
| C-1 | A-1 | 100 | 1.85 | $8.1 \times 10^{-1}$ |
| C-2 | A-2 | 105 | 1.81 | $7.4 \times 10^{-1}$ |
| C-3 | A-3 | 100 | 2.58 | $8.7 \times 10^{-1}$ |
| C-4 | A-4 | 95 | 1.90 | $9.5 \times 10^{-1}$ |
| C-5 | A-5 | 100 | 1.72 | $9.8 \times 10^{-1}$ |
| C-6 | A-6 | 95 | 1.72 | 1.1 |
| C-7 | A-7 | 105 | 1.89 | 1.1 |
| C-8 | A-8 | 110 | 1.92 | $5.1 \times 10^{-1}$ |
| C-9 | A-9 | 100 | 2.04 | 1.2 |
| C-10 | A-10 | 105 | 2.02 | 1.3 |
| C-11 | A-11 | 100 | 2.10 | $9.6 \times 10^{-1}$ |
| C-12 | A-12 | 95 | 2.25 | 1.4 |

TABLE 2-continued

| Physical Properties of Coat Layer of Developer Carrying Member | | | | |
|---|---|---|---|---|
| Developer carrying member | Particles added in conductive coat layer | Conductive coat layer coating weight (mg) | Ra ($\mu$m) | Volume resistivity ($\Omega \cdot$ cm) |
| C-13 | A-13 | 100 | 2.28 | 1.6 |
| C-14 | A-14 | 105 | 2.06 | $6.5 \times 10^{-1}$ |
| C-15 | A-1 | 100 | 1.70 | $7.0 \times 10^{-1}$ |
| C-16 | A-1 | 105 | 1.83 | $7.9 \times 10^{-1}$ |
| C-17 | A-2 | 265 | 1.01 | 1.1 |
| D-1 | a-1 | 100 | 2.30 | $6.8 \times 10^{-1}$ |
| D-2 | a-2 | 100 | 2.03 | 1.7 |
| D-3 | a-3 | 105 | 2.82 | $7.1 \times 10^{-1}$ |
| D-4 | a-4 | 105 | 0.78 | 1.2 |
| D-5 | a-5 | 105 | 2.01 | $6.0 \times 10^{-1}$ |
| D-6 | a-6 | 95 | 2.35 | $1.4 \times 10^{-1}$ |
| D-7 | a-7 | 270 | 1.00 | $0.98 \times 10^{-1}$ |

TABLE 3

| | L/L running density | | | L/L running fog | | | L/L running ghost | | | |
|---|---|---|---|---|---|---|---|---|---|---|
| | 10 sheets | 20,000 sheets | 40,000 sheets | 10 sheets | 20,000 sheets | 40,000 sheets | 10 sheets | 20,000 sheets | 40,000 sheets | Test machine |
| Example: | | | | | | | | | | |
| 1 | 1.43 | 1.42 | 1.42 | 0.9 | 1.2 | 1.4 | A | A | AB | Laser |
| 2 | 1.44 | 1.41 | 1.39 | 0.9 | 1.3 | 1.5 | A | AB | AB | Jet |
| 3 | 1.45 | 1.41 | 1.38 | 1.1 | 1.5 | 1.7 | A | AB | AB | III Si |
| 4 | 1.44 | 1.42 | 1.41 | 0.8 | 1.2 | 1.5 | A | A | AB | " |
| 5 | 1.45 | 1.40 | 1.38 | 0.9 | 1.4 | 1.8 | A | AB | AB | " |
| 6 | 1.46 | 1.41 | 1.37 | 0.8 | 1.5 | 1.9 | A | AB | AB | " |
| 7 | 1.45 | 1.43 | 1.42 | 0.9 | 1.1 | 1.5 | A | A | AB | " |
| 8 | 1.44 | 1.39 | 1.35 | 1.0 | 1.7 | 2.3 | A | AB | B | " |
| 9 | 1.46 | 1.40 | 1.37 | 1.1 | 1.6 | 2.0 | A | AB | AB | " |
| 10 | 1.45 | 1.41 | 1.38 | 0.9 | 1.4 | 1.8 | A | AB | AB | " |
| 11 | 1.45 | 1.40 | 1.37 | 1.0 | 1.7 | 2.0 | A | AB | AB | " |
| 12 | 1.46 | 1.41 | 1.36 | 1.2 | 1.7 | 2.2 | A | AB | B | " |
| 13 | 1.45 | 1.38 | 1.34 | 1.0 | 1.8 | 2.5 | A | AB | B | " |
| 14 | 1.44 | 1.37 | 1.32 | 1.1 | 1.9 | 2.6 | A | AB | B | " |
| 15 | 1.45 | 1.36 | 1.31 | 0.9 | 2.1 | 2.8 | A | B | B | " |
| 16 | 1.44 | 1.41 | 1.37 | 0.9 | 1.4 | 1.8 | A | AB | AB | " |
| Comparative Example: | | | | | | | | | | |
| 1 | 1.42 | 1.17 | 0.95 | 1.5 | 3.5 | 4.2 | A | C | C | " |
| 2 | 1.43 | 1.29 | 1.05 | 1.2 | 2.8 | 3.7 | A | B | C | " |
| 3 | 1.45 | 1.29 | 1.06 | 1.5 | 3.0 | 3.9 | A | B | C | " |
| 4 | 1.35 | 1.16 | 0.94 | 1.0 | 2.5 | 3.4 | AB | C | C | " |
| 5 | 1.40 | 1.27 | 1.04 | 1.3 | 2.9 | 3.8 | A | B | C | " |
| 6 | 1.45 | 1.27 | 1.03 | 1.5 | 3.2 | 4.0 | A | B | C | " |
| | 10 sheets | 200,000 sheets | 400,000 sheets | 10 sheets | 200,000 sheets | 400,000 sheets | 10 sheets | 200,000 sheets | 400,000 sheets | Test machine |
| Example: | | | | | | | | | | |
| 17 | 1.45 | 1.42 | 1.39 | 0.8 | 1.1 | 1.7 | A | A | AB | NP6060 |
| Comparative Example: | | | | | | | | | | |
| 7 | 1.46 | 1.16 | 1.00 | 1.4 | 3.2 | 4.0 | A | B | C | " |

TABLE 4

| | H/H running density | | | H/H running fog | | | H/H running ghost | | | |
|---|---|---|---|---|---|---|---|---|---|---|
| | 10 sheets | 20,000 sheets | 40,000 sheets | 10 sheets | 20,000 sheets | 40,000 sheets | 10 sheets | 20,000 sheets | 40,000 sheets | Test machine |
| Example: | | | | | | | | | | |
| 1 | 1.37 | 1.35 | 1.34 | 0.8 | 1.0 | 1.3 | A | A | A | Laser |
| 2 | 1.36 | 1.34 | 1.32 | 0.8 | 1.1 | 1.4 | A | A | A | Jet |
| 3 | 1.35 | 1.32 | 1.30 | 1.0 | 1.3 | 1.6 | A | A | A | III Si |
| 4 | 1.37 | 1.34 | 1.33 | 0.7 | 0.9 | 1.2 | A | A | A | " |
| 5 | 1.38 | 1.33 | 1.31 | 0.7 | 1.2 | 1.5 | A | A | A | " |
| 6 | 1.37 | 1.32 | 1.30 | 0.8 | 1.3 | 1.6 | A | A | A | " |
| 7 | 1.38 | 1.36 | 1.34 | 0.7 | 1.0 | 1.3 | A | A | A | " |
| 8 | 1.34 | 1.30 | 1.27 | 1.1 | 1.6 | 2.0 | A | AB | AB | " |
| 9 | 1.37 | 1.33 | 1.29 | 1.0 | 1.5 | 1.9 | A | A | AB | " |
| 10 | 1.35 | 1.31 | 1.28 | 0.9 | 1.5 | 1.9 | A | A | AB | " |
| 11 | 1.37 | 1.32 | 1.29 | 1.0 | 1.6 | 2.0 | A | A | AB | " |
| 12 | 1.36 | 1.30 | 1.27 | 1.1 | 1.5 | 2.1 | A | AB | AB | " |
| 13 | 1.37 | 1.31 | 1.27 | 1.0 | 1.5 | 2.0 | A | AB | AB | " |
| 14 | 1.34 | 1.29 | 1.25 | 1.0 | 1.7 | 2.3 | A | AB | AB | " |
| 15 | 1.37 | 1.29 | 1.24 | 1.0 | 1.9 | 2.6 | A | AB | AB | " |
| 16 | 1.37 | 1.33 | 1.29 | 0.9 | 1.5 | 1.9 | A | A | AB | " |
| Comparative Example: | | | | | | | | | | |
| 1 | 1.35 | 1.15 | 0.95 | 1.3 | 3.2 | 4.0 | A | B | C | " |
| 2 | 1.36 | 1.20 | 1.03 | 1.2 | 2.7 | 3.5 | A | AB | C | " |
| 3 | 1.33 | 1.17 | 1.00 | 1.5 | 3.0 | 3.7 | A | AB | C | " |
| 4 | 1.35 | 1.14 | 0.94 | 0.9 | 2.5 | 3.2 | A | B | C | " |
| 5 | 1.32 | 1.13 | 0.93 | 1.5 | 3.1 | 3.8 | A | B | C | " |
| 6 | 1.36 | 1.16 | 1.02 | 1.6 | 3.1 | 3.6 | A | B | C | " |
| | 10 sheets | 200,000 sheets | 400,000 sheets | 10 sheets | 200,000 sheets | 400,000 sheets | 10 sheets | 200,000 sheets | 400,000 sheets | Test machine |
| Example: | | | | | | | | | | |
| 17 | 1.37 | 1.35 | 1.32 | 0.8 | 1.0 | 1.3 | A | A | A | NP6060 |
| Comparative Example: | | | | | | | | | | |
| 7 | 1.35 | 1.17 | 1.01 | 1.4 | 2.9 | 3.7 | A | AB | C | " |

TABLE 5

| | | Water resistance | | | Anti-contamination properties | | |
|---|---|---|---|---|---|---|---|
| | Developer carrying member | Before running Ra ($\mu$m) | After L/L running Ra ($\mu$m) | After H/H running Ra ($\mu$m) | After L/L running | After H/H rung ning | Test machine |
| Example: | | | | | | | |
| 1 | C-1 | 1.85 | 1.81 | 1.76 | A | A | LJ |
| 2 | C-2 | 1.81 | 1.72 | 1.69 | A | AB | " |
| 3 | C-3 | 2.58 | 2.41 | 2.38 | A | AB | " |
| 4 | C-4 | 1.90 | 1.85 | 1.83 | A | A | " |
| 5 | C-5 | 1.72 | 1.60 | 1.57 | A | AB | " |
| 6 | C-6 | 1.72 | 1.61 | 1.60 | A | AB | " |
| 7 | C-7 | 1.89 | 1.81 | 1.78 | A | A | " |
| 8 | C-8 | 1.92 | 1.70 | 1.65 | AB | B | " |
| 9 | C-9 | 2.04 | 1.92 | 1.87 | A | AB | " |
| 10 | C-10 | 2.02 | 1.87 | 1.79 | A | AB | " |
| 11 | C-11 | 2.10 | 1.96 | 1.90 | A | AB | " |
| 12 | C-12 | 2.25 | 2.00 | 1.95 | AB | B | " |
| 13 | C-13 | 2.28 | 2.01 | 1.97 | AB | B | " |
| 14 | C-14 | 2.06 | 1.83 | 1.79 | AB | B | " |
| 15 | C-15 | 1.70 | 1.44 | 1.41 | B | B | " |
| 16 | C-16 | 1.83 | 1.63 | 1.60 | A | AB | " |
| Comparative Example: | | | | | | | |
| 1 | D-1 | 2.30 | 0.97 | 0.90 | B | C | LJ |
| 2 | D-2 | 2.03 | 1.69 | 1.61 | B | C | " |
| 3 | D-3 | 2.82 | 2.21 | 2.12 | B | B | " |
| 4 | D-4 | 0.78 | 0.65 | 0.63 | C | C | " |
| 5 | D-5 | 2.01 | 1.09 | 1.03 | B | C | " |
| 6 | D-6 | 2.35 | 1.15 | 1.07 | B | C | " |
| Example: | | | | | | | |
| 17 | C-17 | 1.01 | 0.94 | 0.92 | A | A | NP |
| Comparative Example: | | | | | | | |
| 7 | D-7 | 1.00 | 0.70 | 0.64 | B | C | " |

LJ: Laser Jet III Si
NP: NP-6060

What is claimed is:

1. A developer carrying member comprising:

a substrate; and a conductive coat layer that covers a surface of the substrate, wherein said conductive coat layer contains at least a binder resin and conductive spherical particles having a number average particle diameter of from 0.3 μm to 30 μm and a true density of 3 g/cm$^3$ or below, dispersed in the binder resin.

2. The developer carrying member according to claim 1, wherein said conductive spherical particles have a number average particle diameter of from 2 μm to 20 μm.

3. The developer carrying member according to claim 1, wherein said conductive spherical particles have a true density of from 0.9 g/cm$^3$ to 2.7 g/cm$^3$.

4. The developer carrying member according to claim 1, wherein said conductive spherical particles have a major axis/minor axis ratio in the range of from 1.0 to 1.5.

5. The developer carrying member according to claim 1, wherein said conductive spherical particles have a volume resistivity of $10^6$ Ω·cm or below.

6. The developer carrying member according to claim 1, wherein said conductive spherical particles comprise carbon particles.

7. The developer carrying member according to claim 6, wherein surfaces of said carbon particles are coated with a conductive metal or a conductive metal oxide, or both.

8. The developer carrying member according to claim 1, wherein said conductive spherical particles comprise particles whose surfaces have been subjected to conductive treatment.

9. The developer carrying member according to claim 1, wherein said conductive spherical particles comprise resin particles with conductive fine particles dispersed therein.

10. The developer carrying member according to claim 1, wherein said conductive coat layer further contains a lubricating material in addition to said conductive spherical particles.

11. The developer carrying member according to claim 10, wherein said lubricating material comprises a member selected from the group consisting of graphite, molybdenum disulfide, boron nitride, mica, graphite fluoride, silver-niobium selenide, calcium chloride-graphite, talc, and a fatty acid metal salt.

12. The developer carrying member according to claim 10, wherein said lubricating material has a number average particle diameter of from 0.2 μm to 20 μm.

13. The developer carrying member according to claim 10, wherein said lubricating material is contained in the conductive coat layer in an amount of from 5 parts by weight to 120 parts by weight based on 100 parts by weight of said binder resin.

14. The developer carrying member according to claim 10, wherein said lubricating material is contained in the conductive coat layer in an amount of from 10 parts by weight to 100 parts by weight based on 100 parts by weight of said binder resin.

15. The developer carrying member according to claim 1, wherein said conductive coat layer has a volume resistivity of $10^3$ Ω·cm or below.

16. The developer carrying member according to claim 1, wherein said conductive coat layer has a volume resistivity of from $10^3$ Ω·cm to $10^{-2}$ Ω·cm.

17. The developer carrying member according to claim 1, wherein said conductive coat layer further contains conductive fine particles in addition to said conductive spherical particles.

18. The developer carrying member according to claim 17, wherein said conductive fine particles comprise at least one member selected from the group consisting of carbon black, a metal oxide, a metal and an inorganic filler.

19. The developer carrying member according to claim 17, wherein said conductive fine particles are contained in the conductive coat layer in an amount not more than 40 parts by weight based on 100 parts by weight of said binder resin.

20. The developer carrying member according to claim 17, wherein said conductive fine particles are contained in the conductive coat layer in an amount of from 2 parts by weight to 35 parts by weight based on 100 parts by weight of said binder resin.

21. The developer carrying member according to claim 1, wherein said conductive spherical particles are contained in the conductive coat layer in an amount of from 2 parts by weight to 120 parts by weight based on 100 parts by weight of said binder resin.

22. The developer carrying member according to claim 1, wherein said conductive spherical particles are contained in the conductive coat layer in an amount of from 2 parts by weight to 80 parts by weight based on 100 parts by weight of said binder resin.

23. The developer carrying member according to claim 1, wherein a surface of said conductive coat layer has a center-line average height Ra of from 0.2 μm to 4.5 μm.

24. The developer carrying member according to claim 1, wherein a surface of said conductive coat layer has a center-line average height Ra of from 0.4 μm to 3.5 μm.

25. The developer carrying member according to claim 1, wherein said conductive spherical particles are produced by firing spherical resin particles having surfaces that are coated with bulk-mesophase pitch, thereby carbonizing and/or graphitizing the spherical resin particles.

26. A developing assembly comprising:

a developer container holding a developer; and a developer carrying member for carrying the developer held in said developer container and for transporting the developer to a developing zone, wherein said developer carrying member comprises a substrate, and a conductive coat layer that covers a surface of the substrate, and wherein the conductive coat layer contains at least a binder resin and conductive spherical particles having a number average particle diameter of from 0.3 μm to 30 μm and a true density of 3 g/cm$^3$ or below, dispersed in the binder resin.

27. The developing assembly according to claim 26, further comprising a developer layer thickness control member for forming a thin developer layer on an outer surface of said developer carrying member.

28. The developing assembly according to claim 27, wherein said developer layer thickness control member is a magnetic control blade.

29. The developing assembly according to claim 27, wherein said developer layer thickness control member is elastically brought into press-contact touch with said developer carrying member through said developer.

30. The developing assembly according to claim 29, wherein said developer layer thickness control member is an elastic control member.

31. The developing assembly according to claim 27, wherein a thickness of the developer layer formed on said outer surface of said developer carrying member is smaller than a minimum gap between an electrostatic latent image bearing member and said developer carrying member, which form the developing zone.

32. The developing assembly according to claim 27, further comprising means for generating a vibrating electric field at the developing zone, wherein a thickness of the developer layer formed on said outer surface of said developer carrying member is smaller than a minimum gap between an electrostatic latent image bearing member and said developer carrying member, which form the developing zone.

33. The developing assembly according to claim 26, wherein said developer is a magnetic one component type developer comprising a magnetic toner.

34. The developing assembly according to claim 26, wherein said developer is a non-magnetic one component type developer comprising a non-magnetic toner.

35. The developing assembly according to claim 26, wherein said developer is a two component type developer comprising a toner and a carrier.

36. The developing assembly according to claim 26, wherein said conductive spherical particles have a number average particle diameter of from 2 $\mu$m to 20 $\mu$m.

37. The developing assembly according to claim 26, wherein said conductive spherical particles have a true density of from 0.9 g/cm$^3$ to 2.7 g/cm$^3$.

38. The developing assembly according to claim 26, wherein said conductive spherical particles have a major axis/minor axis ratio in the range of from 1.0 to 1.5.

39. The developing assembly according to claim 26, wherein said conductive spherical particles have a volume resistivity of $10^6$ Ω·cm or below.

40. The developing assembly according to claim 26, wherein said conductive spherical particles comprise carbon particles.

41. The developing assembly according to claim 40, wherein surfaces of said carbon particles are coated with a conductive metal or a conductive metal oxide, or both.

42. The developing assembly according to claim 26, wherein said conductive spherical particles comprise particles whose surfaces have been subjected to conductive treatment.

43. The developing assembly according to claim 26, wherein said conductive spherical particles comprise resin particles with conductive fine particles dispersed therein.

44. The developing assembly according to claim 26, wherein said conductive coat layer further contains a lubricating material in addition to said conductive spherical particles.

45. The developing assembly according to claim 44, wherein said lubricating material comprises a member selected from the group consisting of graphite, molybdenum disulfide, boron nitride, mica, graphite fluoride, silver-niobium selenide, calcium chloride-graphite, talc, and a fatty acid metal salt.

46. The developing assembly according to claim 44, wherein said lubricating material has a number average particle diameter of from 0.2 $\mu$m to 20 $\mu$m.

47. The developing assembly according to claim 44, wherein said lubricating material is contained in the conductive coat layer in an amount of from 5 parts by weight to 120 parts by weight based on 100 parts by weight of said binder resin.

48. The developing assembly according to claim 44, wherein said lubricating material is contained in the conductive coat layer in an amount of from 10 parts by weight to 100 parts by weight based on 100 parts by weight of said binder resin.

49. The developing assembly according to claim 26, wherein said conductive coat layer has a volume resistivity of $10^3$ Ω·cm or below.

50. The developing assembly according to claim 26, wherein said conductive coat layer has a volume resistivity of from $10^3$ Ω·cm to $10^{-2}$ Ω·cm.

51. The developing assembly according to claim 26, wherein said conductive coat layer further contains conductive fine particles in addition to said conductive spherical particles.

52. The developing assembly according to claim 51, wherein said conductive fine particles comprise at least one member selected from the group consisting of carbon black, a metal oxide, a metal and an inorganic filler.

53. The developing assembly according to claim 52, wherein said conductive fine particles are contained in the conductive coat layer in an amount not more than 40 parts by weight based on 100 parts by weight of said binder resin.

54. The developing assembly according to claim 51, wherein said conductive fine particles are contained in the conductive coat layer in an amount of from 2 parts by weight to 35 parts by weight based on 100 parts by weight of said binder resin.

55. The developing assembly according to claim 26, wherein said conductive spherical particles are contained in the conductive coat layer in an amount of from 2 parts by weight to 120 parts by weight based on 100 parts by weight of said binder resin.

56. The developing assembly according to claim 26, wherein said conductive spherical particles are contained in the conductive coat layer in an amount of from 2 parts by weight to 80 parts by weight based on 100 parts by weight of said binder resin.

57. The developing assembly according to claim 26, wherein a surface of said conductive coat layer has a center-line average height Ra of from 0.2 $\mu$m to 4.5 $\mu$m.

58. The developing assembly according to claim 26, wherein a surface of said conductive coat layer has a center-line average height Ra of from 0.4 $\mu$m to 3.5 $\mu$m.

59. The developing assembly according to claim 26, wherein said conductive spherical particles are produced by firing spherical resin particles having surfaces that are coated with bulk-mesophase pitch, thereby carbonizing and/or graphitizing the spherical resin particles.

60. The developing assembly according to claim 26, further comprising means for generating a vibrating electric field at the developing zone.

61. The developing assembly according to claim 60, further comprising a power source for applying an alternating bias voltage to said developer carrying member.

62. An image forming apparatus comprising:

a latent image bearing member for bearing an electrostatic latent image; and a developing assembly for developing the electrostatic latent image to form a developed image, said developing assembly comprising:

a developer container holding a developer; and a developer carrying member for carrying the developer held in said developer container and for transporting the developer to a developing zone, wherein said developer carrying member comprises a substrate, and a conductive coat layer that covers a surface of the substrate, and wherein the conductive coat layer contains at least a binder resin and conductive spherical particles having a number average particle diameter of from 0.3 $\mu$m to 30 $\mu$m and a true density of 3 g/cm$^3$ or below, dispersed in the binder resin.

63. The image forming apparatus according to claim 62, further comprising a developer layer thickness control member for forming a thin developer layer on an outer surface of said developer carrying member.

64. The image forming apparatus according to claim 63, wherein said developer layer thickness control member is a magnetic control blade.

65. The image forming apparatus according to claim 63, wherein said developer layer thickness control member is elastically brought into press-contact with said developer carrying member through said developer.

66. The image forming apparatus according to claim 65, wherein said developer layer thickness control member is an elastic control member.

67. The image forming apparatus according to claim 63, wherein a thickness of the developer layer formed on said outer surface of said developer carrying member is smaller than a minimum gap between said latent image bearing member and said developer carrying member, which form the developing zone.

68. The developing assembly according to claim 63, further comprising means for generating a vibrating electric field at the developing zone, wherein a thickness of the developer layer formed on an outer surface of said developer carrying member is smaller than a minimum gap between said latent image bearing member and said developer carrying member, which form the developing zone.

69. The image forming apparatus according to claim 62, wherein said developer is a magnetic one component type developer comprising a magnetic toner.

70. The image forming apparatus according to claim 62, wherein said developer is a non-magnetic one component type developer comprising a non-magnetic toner.

71. The image forming apparatus according to claim 62, wherein said developer is a two component type developer comprising a toner and a carrier.

72. The image forming apparatus according to claim 62, wherein said latent image bearing member is an electrophotographic photosensitive member.

73. The image forming apparatus according to claim 62, further comprising transfer means for transferring said developed image to a recording medium.

74. The image forming apparatus according to claim 62, further comprising fixing means for fixing said developed image to a recording medium.

75. An image forming apparatus according to claim 62, wherein said conductive spherical particles have a number average particle diameter of from 2 $\mu$m to 20 $\mu$m.

76. An image forming apparatus according to claim 62, wherein said conductive spherical particles have a true density of from 0.9 g/cm$^3$ to 2.7 g/cm$^3$.

77. An image forming apparatus according to claim 62, wherein said conductive spherical particles have a major axis/minor axis ratio in the range of from 1.0 to 1.5.

78. An image forming apparatus according to claim 62, wherein said conductive spherical particles have a volume resistivity of $10^6$ $\Omega\cdot$cm or below.

79. An image forming apparatus according to claim 62, wherein said conductive spherical particles comprise carbon particles.

80. An image forming apparatus according to claim 79, wherein surfaces of said carbon particles are coated with a conductive metal or a conductive metal oxide, or both.

81. An image forming apparatus according to claim 62, wherein said conductive spherical particles comprise particles whose surfaces have been subjected to conductive treatment.

82. An image forming apparatus according to claim 62, wherein said conductive spherical particles comprise resin particles with conductive fine particles dispersed therein.

83. An image forming apparatus according to claim 62, wherein said conductive coat layer further contains a lubricating material in addition to said conductive spherical particles.

84. An image forming apparatus according to claim 83, wherein said lubricating material comprises a member selected from the group consisting of graphite, molybdenum disulfide, boron nitride, mica, graphite fluoride, silver-niobium selenide, calcium chloride-graphite, talc, and a fatty acid metal salt.

85. An image forming apparatus according to claim 83, wherein said lubricating material has a number average particle diameter of from 0.2 $\mu$m to 20 $\mu$m.

86. An image forming apparatus according to claim 83, wherein said lubricating material is contained in the conductive coat layer in an amount of from 5 parts by weight to 120 parts by weight based on 100 parts by weight of said binder resin.

87. An image forming apparatus according to claim 83, wherein said lubricating material is contained in the conductive coat layer in an amount of from 10 parts by weight to 100 parts by weight based on 100 parts by weight of said binder resin.

88. An image forming apparatus according to claim 62, wherein said conductive coat layer has a volume resistivity of $10^3$ $\Omega\cdot$cm or below.

89. An image forming apparatus according to claim 62, wherein said conductive coat layer has a volume resistivity of from $10^3$ $\Omega\cdot$cm to $10^{-2}$ $\Omega\cdot$cm.

90. An image forming apparatus according to claim 62, wherein said conductive coat layer further contains conductive fine particles in addition to said conductive spherical particles.

91. An image forming apparatus according to claim 90, wherein said conductive fine particles comprise at least one member selected from the group consisting of carbon black, a metal oxide, a metal and an inorganic filler.

92. An image forming apparatus according to claim 90, wherein said conductive fine particles are contained in the conductive coat layer in an amount not more than 40 parts by weight based on 100 parts by weight of said binder resin.

93. An image forming apparatus according to claim 90, wherein said conductive fine particles are contained in the conductive coat layer in an amount of from 2 parts by weight to 35 parts by weight based on 100 parts by weight of said binder resin.

94. An image forming apparatus according to claim 62, wherein said conductive spherical particles are contained in the conductive coat layer in an amount of from 2 parts by weight to 120 parts by weight based on 100 parts by weight of said binder resin.

95. An image forming apparatus according to claim 62, wherein said conductive spherical particles are contained in the conductive coat layer in an amount of from 2 parts by weight to 80 parts by weight based on 100 parts by weight of said binder resin.

96. An image forming apparatus according to claim 62, wherein a surface of said conductive coat layer has a center-line average height Ra of from 0.2 $\mu$m to 4.5 $\mu$m.

97. An image forming apparatus according to claim 62, wherein a surface of said conductive coat layer has a center-line average height Ra of from 0.4 $\mu$m to 3.5 $\mu$m.

98. The image forming apparatus according to claim 62, wherein said conductive spherical particles are produced by firing spherical resin particles having surfaces that are coated with bulk-mesophase pitch, thereby carbonizing and/or graphitizing the spherical resin particles.

99. The image forming apparatus according to claim 62, further comprising means for generating a vibrating electric field at the developing zone.

100. The image forming apparatus according to claim 99, further comprising a power source for applying an alternating bias voltage to said developer carrying member.

101. A process cartridge detachably mountable on a main assembly of an image forming apparatus, said process cartridge comprising:

a latent image bearing member for bearing an electrostatic latent image; and developing means for developing the electrostatic latent image, said developing means comprising;

a developer; and a developer carrying member for carrying and transporting the developer to a developing zone, wherein said developer carrying member comprises a substrate, and a conductive coat layer that covers a surface of the substrate, and the conductive coat layer contains at least a binder resin and conductive spherical particles having a number average particle diameter of from 0.3 $\mu$m to 30 $\mu$m and a true density of 3 g/cm$^3$ or below, dispersed in the binder resin.

102. The process cartridge according to claim 101, further comprising a developer layer thickness control member for forming a thin developer layer on an outer surface of said developer carrying member.

103. The process cartridge according to claim 102, wherein said developer layer thickness control member is a magnetic control blade.

104. The process cartridge according to claim 102, wherein said developer layer thickness control member is elastically brought into pressure touch with said developer carrying member through said developer.

105. The process cartridge according to claim 104, wherein said developer layer thickness control member is an elastic control member.

106. The process cartridge according to claim 102, wherein a thickness of the developer layer formed on said outer surface of said developer carrying member is smaller than a minimum gap between said latent image bearing member and said developer carrying member, which form the developing zone.

107. The process cartridge according to claim 101, wherein said developer is a magnetic one component type developer comprising a magnetic toner.

108. The process cartridge according to claim 101, wherein said developer is a non-magnetic one component type developer comprising a non-magnetic toner.

109. The process cartridge according to claim 101, wherein said developer is a two component type developer comprising a toner and a carrier.

110. The process cartridge according to claim 101, wherein said latent image bearing member is an electrophotographic photosensitive member.

111. The process cartridge according to claim 101, further comprising at least one of cleaning means and primary charging means, joined into one unit as said process cartridge in addition to said latent image bearing member, said latent image bearing member comprising an electrophotographic photosensitive member.

112. A process cartridge according to claim 101, wherein said conductive spherical particles have a number average particle diameter of from 2 $\mu$m to 20 $\mu$m.

113. A process cartridge according to claim 101, wherein said conductive spherical particles have a true density of from 0.9 g/cm$^3$ to 2.7 g/cm$^3$.

114. A process cartridge according to claim 101, wherein said conductive spherical particles have a major axis/minor axis ratio in the range of from 1.0 to 1.5.

115. A process cartridge according to claim 101, wherein said conductive spherical particles have a volume resistivity of $10^6$ Ω·cm or below.

116. A process cartridge according to claim 101, wherein said conductive spherical particles comprise carbon particles.

117. A process cartridge according to claim 116, wherein surfaces of said carbon particles are coated with a conductive metal or a conductive metal oxide, or both.

118. A process cartridge according to claim 101, wherein said conductive spherical particles comprise particles whose surfaces have been subjected to conductive treatment.

119. A process cartridge according to claim 101, wherein said conductive spherical particles comprise resin particles with conductive fine particles dispersed therein.

120. A process cartridge according to claim 101, wherein said conductive coat layer further contains a lubricating material in addition to said conductive spherical particles.

121. A process cartridge according to claim 120, wherein said lubricating material comprises a member selected from the group consisting of graphite, molybdenum disulfide, boron nitride, mica, graphite fluoride, silver-niobium selenide, calcium chloride-graphite, talc, and a fatty acid metal salt.

122. A process cartridge according to claim 120, wherein said lubricating material has a number average particle diameter of from 0.2 $\mu$m to 20 $\mu$m.

123. A process cartridge according to claim 120, wherein said lubricating material is contained in the conductive coat layer in an amount of from 5 parts by weight to 120 parts by weight based on 100 parts by weight of said binder resin.

124. A process cartridge according to claim 120, wherein said lubricating material is contained in the conductive coat layer in an amount of from 10 parts by weight to 100 parts by weight based on 100 parts by weight of said binder resin.

125. A process cartridge according to claim 101, wherein said conductive coat layer has a volume resistivity of $10^3$ Ω·cm or below.

126. A process cartridge according to claim 101, wherein said conductive coat layer has a volume resistivity of from $10^3$ Ω·cm to $10^{-2}$ Ω·cm.

127. A process cartridge according to claim 101, wherein said conductive coat layer further contains conductive fine particles in addition to said conductive spherical particles.

128. A process cartridge according to claim 127, wherein said conductive fine particles comprise at least one member selected from the group consisting of carbon black, a metal oxide, a metal and an inorganic filler.

129. A process cartridge according to claim 127, wherein said conductive fine particles are contained in the conductive coat layer in an amount not more than 40 parts by weight based on 100 parts by weight of said binder resin.

130. A process cartridge according to claim 127, wherein said conductive fine particles are contained in the conductive coat layer in an amount of from 2 parts by weight to 35 parts by weight based on 100 parts by weights of said binder resin.

131. A process cartridge according to claim 101, wherein said conductive spherical particles are contained in the conductive coat layer in an amount of from 2 parts by weight to 120 parts by weight based on 100 parts by weight of said binder resin.

132. A process cartridge according to claim 101, wherein said conductive spherical particles are contained in the conductive coat layer in an amount of from 2 parts by weight to 80 parts by weight based on 100 parts by weight of said binder resin.

133. A process cartridge according to claim 101, wherein a surface of said conductive coat layer has a center-line average height Ra of from 0.2 μm to 4.5 μm.

134. A process cartridge according to claim 101, wherein a surface of said conductive coat layer has a center-line average height Ra of from 0.4 μm to 3.5 μm.

135. The process cartridge according to claim 101, wherein said conductive spherical particles are produced by firing spherical resin particles having surfaces that are coated with bulk-mesophase pitch, thereby carbonizing and/or graphitizing the spherical resin particles.

* * * * *

UNITED STATES PATENT AND TRADEMARK OFFICE
CERTIFICATE OF CORRECTION

PATENT NO. : 5,860,050

DATED : January 12, 1999

INVENTOR(S) : MASAYOSHI SHIMAMURA, ET AL. Page 1 of 2

It is certified that error appears in the above-identified patent and that said Letters Patent is hereby corrected as shown below:

Column 1
Line 45, "60," should read --60--.

Column 4
Line 39, 2μm," should read --2 μm--.

Column 5
Line 66, "methods" should read --method--.

Column 7
Line 55, "to be is" should read --to be--.

Column 8
Line 56, "are" should read --is--.

Column 11
Line 6, "having" should be deleted.

UNITED STATES PATENT AND TRADEMARK OFFICE

CERTIFICATE OF CORRECTION

PATENT NO. : 5,868,700

DATED : January 12, 1999

INVENTOR(S) : MASAYOSHI SHIMAMURA, ET AL.

It is certified that error appears in the above-identified patent and that said Letters Patent is hereby corrected as shown below:

Column 22
Line 65, "druing" should read --drying--.

Column 25
Line 54, "were: should read --was--.

Column 29-30 of Table 5
"Water" (both occurrences) should read --Wear--.
"rung" should read -- run---.

Column 34
Line 12, "Claim 52" should read --Claim 51--.

Column 37
Line 13, "comprising;" should read --comprising:--.

Column 38
Line 64, "weights" should read --weight--.

Signed and Sealed this

Seventeenth Day of August, 1999

Attest:

Q. TODD DICKINSON

Attesting Officer

*Acting Commissioner of Patents and Trademarks*